（12） United States Patent
Kilgore

(10) Patent No.: US 11,771,175 B2
(45) Date of Patent: Oct. 3, 2023

(54) FOOTWEAR MANUFACTURING WITH AN ORIGIN

(71) Applicant: NIKE, Inc., Beaverton, OR (US)

(72) Inventor: Bruce J. Kilgore, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/679,919

(22) Filed: Feb. 24, 2022

(65) Prior Publication Data

US 2022/0175088 A1 Jun. 9, 2022

Related U.S. Application Data

(62) Division of application No. 15/509,102, filed as application No. PCT/US2016/034143 on May 25, 2016, now Pat. No. 11,284,673.

(60) Provisional application No. 62/168,639, filed on May 29, 2015.

(51) Int. Cl.
*A43B 23/02* (2006.01)
*A43B 23/07* (2006.01)
*A43B 23/00* (2006.01)
*B29D 35/00* (2010.01)

(52) U.S. Cl.
CPC ...... *A43B 23/0235* (2013.01); *A43B 23/0245* (2013.01); *A43B 23/07* (2013.01); *A43B 23/00* (2013.01); *B29D 35/00* (2013.01)

(58) Field of Classification Search
CPC . A43B 23/0235; A43B 23/0245; A43B 23/00; A43B 23/07; A43B 23/02; A43B 9/00; A43D 11/00; A43D 8/28; A43D 8/02; B29D 35/00
See application file for complete search history.

(56) References Cited

U.S. PATENT DOCUMENTS

| | | | |
|---|---|---|---|
| 90,252 | A | 5/1869 | French |
| 173,303 | A | 2/1876 | Land |
| 197,350 | A | 11/1877 | Fay |
| 292,464 | A | 1/1884 | Berry |
| 300,526 | A | 6/1884 | Stowe |
| 313,635 | A | 3/1885 | Walp |

(Continued)

FOREIGN PATENT DOCUMENTS

| | | |
|---|---|---|
| CN | 1067566 A | 1/1993 |
| CN | 101370404 A | 2/2009 |

(Continued)

*Primary Examiner* — Jocelyn Bravo
(74) *Attorney, Agent, or Firm* — SHOOK, HARDY & BACON, LLP

(57) ABSTRACT

An article of footwear flat pattern upper (126, 300, 302) portion (216) is provided. The upper portion (302) has a midline reference line (415, 416) extending between the toe end apex (316) and a midpoint on the heel end (314). The upper portion (302) also is comprised of an origin (344) aperture that is located within 10 millimeters of the midline reference line (415, 416) between the toe end (306) and the heel end (314) of the upper portion (302). The upper portion (302) is also formed with an overlay (500) that is coupled with the upper portion (302) between the toe end (306) and the heel end (314) and between the medial side (315) and the lateral side (317). The overlay (500) has an alignment aperture (345) that is aligned with the origin (344) aperture.

20 Claims, 16 Drawing Sheets

(56) References Cited

U.S. PATENT DOCUMENTS

| | | | |
|---|---|---|---|
| 318,033 A | 5/1885 | Ruetzel |
| 320,468 A | 6/1885 | Gillman |
| 328,543 A | 10/1885 | Tompkins |
| 336,214 A | 2/1886 | Cosart |
| 336,913 A | 3/1886 | Graff |
| 361,269 A | 4/1887 | Darner |
| 393,776 A | 12/1888 | McCoy |
| D18,938 S | 2/1889 | Hamilton |
| 440,409 A | 11/1890 | McSwyny |
| 567,149 A | 9/1896 | Marz et al. |
| 761,520 A | 5/1904 | Matthew |
| 1,122,884 A | 12/1914 | Eliason et al. |
| 1,195,825 A | 8/1916 | Lllewellyn |
| 1,258,024 A | 3/1918 | Laybourn |
| D56,801 S | 12/1920 | Codish |
| 1,436,463 A | 11/1922 | Silver |
| 1,436,479 A | 11/1922 | George |
| 1,710,043 A | 4/1929 | Campbell |
| 1,814,518 A | 7/1931 | Mcgrail |
| 1,922,051 A | 8/1933 | Morris |
| 1,947,246 A | 2/1934 | Brauer et al. |
| 1,956,969 A | 5/1934 | Ayers |
| 2,027,953 A | 1/1936 | Barbey et al. |
| 2,034,091 A | 3/1936 | Dunbar |
| 2,076,285 A | 4/1937 | Wiggin |
| 2,088,158 A | 7/1937 | Spelman |
| 2,108,415 A | 2/1938 | Simister |
| 2,297,027 A | 9/1942 | Frank |
| 2,444,822 A | 7/1948 | Griffin |
| 2,471,366 A | 5/1949 | Erminio |
| 2,622,052 A | 12/1952 | Chandler |
| 2,630,636 A | 3/1953 | Cockrell |
| 2,950,545 A | 8/1960 | Herlihy |
| 3,128,567 A | 4/1964 | Huard |
| 3,289,330 A | 12/1966 | Trachsel et al. |
| 3,504,450 A | 4/1970 | Steadman et al. |
| 3,665,793 A | 5/1972 | Lehner |
| 3,762,075 A | 10/1973 | Munschy |
| 3,813,719 A | 6/1974 | Kaschura |
| 4,001,954 A | 1/1977 | Taylor, Jr. |
| 4,031,586 A | 6/1977 | Von et al. |
| 4,149,323 A | 4/1979 | Roy |
| 4,255,875 A | 3/1981 | Gilkerson |
| 4,265,032 A * | 5/1981 | Levine ............... A43B 23/027 36/3 R |
| 4,741,062 A | 5/1988 | Blanc et al. |
| 4,845,862 A | 7/1989 | Phillips et al. |
| 5,099,588 A | 3/1992 | Scholl |
| 5,345,638 A * | 9/1994 | Nishida ............... A43D 111/00 36/45 |
| 5,499,459 A | 3/1996 | Tomaro |
| 5,604,997 A | 2/1997 | Dieter |
| 5,932,056 A | 8/1999 | Mark et al. |
| 6,299,962 B1 | 10/2001 | Davis et al. |
| 6,558,784 B1 * | 5/2003 | Norton ............... A43B 23/026 36/49 |
| 7,051,460 B2 | 5/2006 | Orei et al. |
| 7,171,767 B2 | 2/2007 | Hatfield et al. |
| 7,347,011 B2 | 3/2008 | Dua et al. |
| 7,634,831 B2 | 12/2009 | Stockbridge et al. |
| 7,849,609 B2 | 12/2010 | Edington et al. |
| 7,987,617 B2 | 8/2011 | Kohatsu et al. |
| 8,434,245 B2 | 5/2013 | Bell et al. |
| 8,544,191 B2 | 10/2013 | Marvin et al. |
| 8,789,295 B2 | 7/2014 | Burch et al. |
| 8,925,129 B2 | 1/2015 | Dojan et al. |
| 9,220,318 B2 | 12/2015 | James et al. |
| 9,877,536 B2 | 1/2018 | Huffman et al. |
| 9,877,539 B1 | 1/2018 | Jackrel |
| 9,924,757 B2 | 3/2018 | Droege et al. |
| 9,936,757 B2 | 4/2018 | Podhajny |
| 10,092,058 B2 | 10/2018 | Droege et al. |
| 2002/0104233 A1 | 8/2002 | Fallon et al. |
| 2003/0131498 A1 | 7/2003 | Liang |
| 2004/0261295 A1 | 12/2004 | Meschter |
| 2006/0112594 A1 * | 6/2006 | Kilgore ............... B29D 35/146 156/73.1 |
| 2006/0117606 A1 | 6/2006 | Chen et al. |
| 2006/0137223 A1 * | 6/2006 | Ziccarelli ............... A43B 19/00 36/55 |
| 2007/0022627 A1 * | 2/2007 | Sokolowski ....... A43B 23/0235 36/3 A |
| 2007/0062067 A1 | 3/2007 | Covatch |
| 2007/0128391 A1 | 6/2007 | Giacobone et al. |
| 2007/0227040 A1 | 10/2007 | Kilgore et al. |
| 2007/0245595 A1 | 10/2007 | Chen et al. |
| 2007/0271821 A1 | 11/2007 | Meschter |
| 2007/0271823 A1 | 11/2007 | Meschter |
| 2008/0078102 A1 | 4/2008 | Kilgore et al. |
| 2008/0086914 A1 | 4/2008 | Curry |
| 2008/0250668 A1 | 10/2008 | Marvin et al. |
| 2009/0126225 A1 | 5/2009 | Jarvis |
| 2011/0088285 A1 | 4/2011 | Dojan et al. |
| 2012/0189852 A1 | 7/2012 | Lee et al. |
| 2012/0198730 A1 | 8/2012 | Burch et al. |
| 2013/0219636 A1 | 8/2013 | Dojan et al. |
| 2014/0059886 A1 | 3/2014 | Lyttle et al. |
| 2014/0082961 A1 | 3/2014 | Marvin et al. |
| 2014/0137434 A1 | 5/2014 | Craig |
| 2014/0202034 A1 | 7/2014 | Vanatta |
| 2014/0223671 A1 | 8/2014 | Fisher et al. |
| 2014/0362079 A1 | 12/2014 | Regan et al. |
| 2015/0101133 A1 | 4/2015 | Manz et al. |
| 2015/0289592 A1 | 10/2015 | Song |
| 2015/0342285 A1 | 12/2015 | Huffman et al. |
| 2016/0145783 A1 * | 5/2016 | Dua ............... B29C 66/14 156/181 |
| 2016/0198796 A1 | 7/2016 | Lyttle et al. |
| 2017/0181501 A1 | 6/2017 | Gautier et al. |
| 2017/0290391 A1 | 10/2017 | Kilgore |
| 2017/0325546 A1 | 11/2017 | Becker et al. |
| 2019/0174868 A1 | 6/2019 | Kilgore et al. |

FOREIGN PATENT DOCUMENTS

| | | |
|---|---|---|
| CN | 102223815 A | 10/2011 |
| CN | 102223817 A | 10/2011 |
| CN | 104287311 A | 1/2015 |
| CN | 205831191 U | 12/2016 |
| TW | 201132310 A | 10/2011 |

* cited by examiner

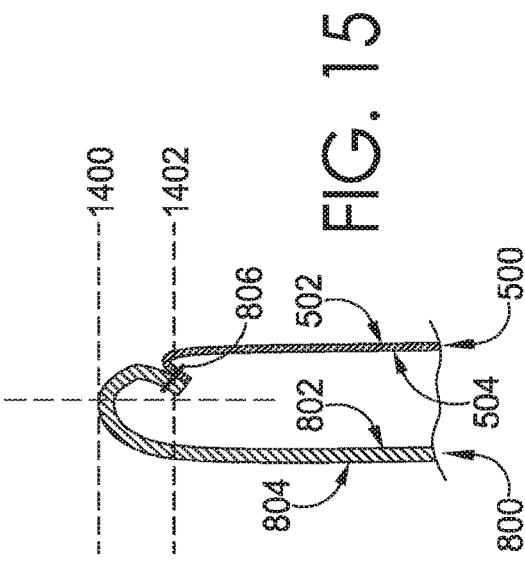
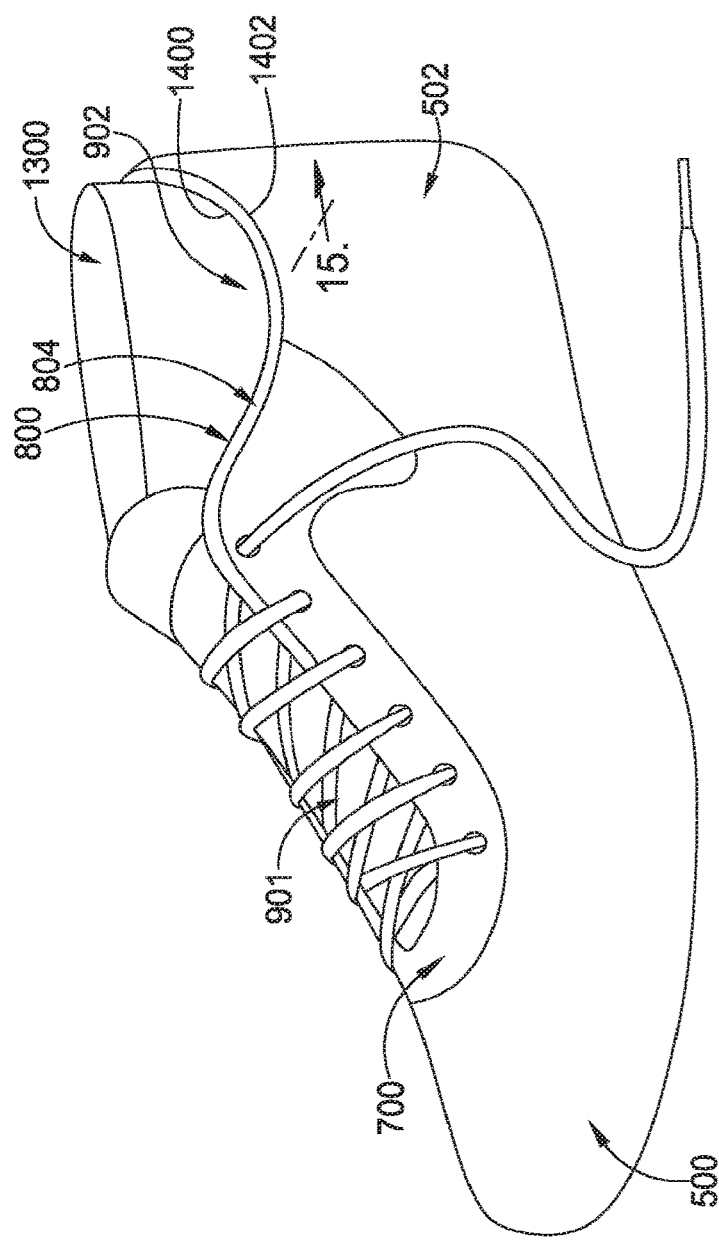

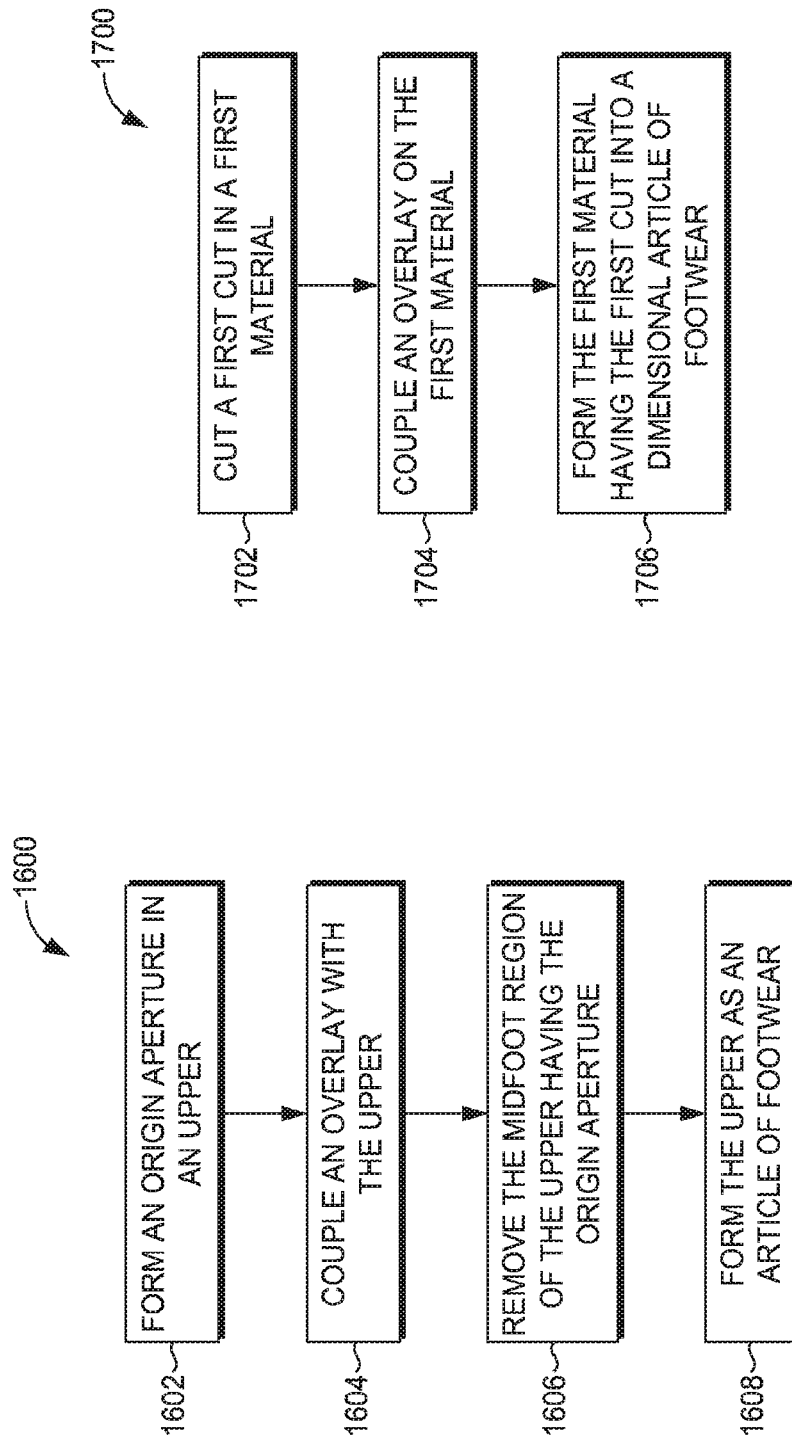

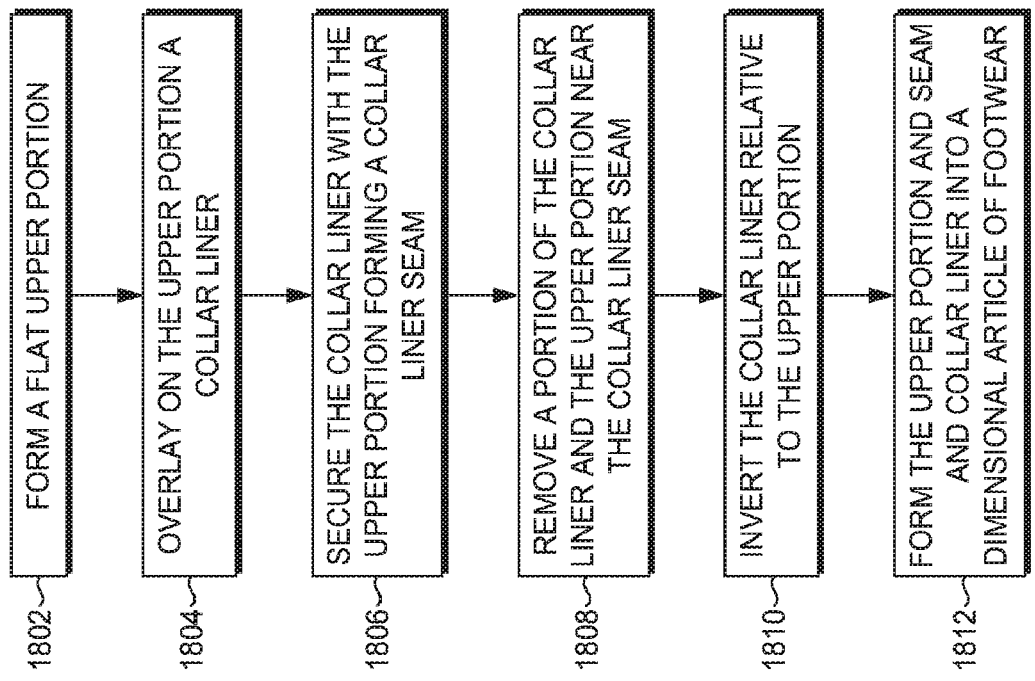

FOOTWEAR MANUFACTURING WITH AN ORIGIN

CROSS-REFERENCE TO RELATED APPLICATIONS AND PRIORITY CLAIM

This application is a divisional of co-pending U.S. patent application Ser. No. 15/509,102, filed Mar. 6, 2017, and titled "Footwear Manufacturing with an Origin," which is a 371 National Stage of PCT App. No. PCT/US2016/034143, filed May 25, 2016, and titled "Footwear Manufacturing with an Origin," which claims priority to U.S. Provisional Patent App. No. 62/168,639, filed May 29, 2015, and titled "Footwear Manufacturing with an Origin." The contents of each of these applications is incorporated herein by reference in the entirety.

BACKGROUND OF THE INVENTION

Manufacturing of footwear has traditionally be a laborious process that involves cutting individual pieces and sewing the pieces together to form the footwear. However, this manufacturing process is batch-like in that a series of operations may be performed on a portion of the shoe by a first operator and then another series of operations, later in time, may be performed by a different operator. This start and stop process can lead to inefficiencies in the process.

SUMMARY OF THE INVENTION

Aspects hereof relate to the continuous in-line manufacturing of articles of footwear.

A first aspect relates to an article of footwear flat pattern upper having an upper portion and a footbed portion. The upper portion and the footbed portion are integrally coextensive, such that the upper portion lateral side converges with the footbed lateral side. The footbed portion includes a concave edge extending between the footbed toe end and the footbed heel end along the footbed medial side and a plurality of forming apertures along the medial side. The upper portion also includes a plurality of forming apertures extending along the medial side.

A second aspect relates to an article of footwear flat pattern upper portion. The upper portion has a midline reference line extending between the toe end apex and a midpoint on the heel end. The upper portion also is comprised of an origin aperture that is located within 10 millimeters of the midline reference line between the toe end and the heel end of the upper portion. The upper portion is also formed with an overlay that is coupled with the upper portion between the toe end and the heel end and between the medial side and the lateral side. The overlay has an alignment aperture that is aligned with the origin aperture.

A third aspect relates to a method of manufacturing an article of footwear from a flat pattern. The method includes cutting a first cut in a first material through the top surface and the bottom surface of the first material. The method continues with coupling an overlay on the first material top surface such that the overlay extends over the first cut and obscures the first material top surface. The method continues with forming the flat pattern having the first material with the first cut and the overlay into a dimensional article of footwear configured to receive a foot. The first material bottom surface is more interior to the dimensional article of footwear than the top surface.

A fourth aspect relates to an article of footwear flat pattern with an integrated collar liner. The flat pattern has a flat upper with a top surface forming an exterior of a dimensional shoe and a bottom surface facing an internal cavity of the dimensional shoe. The flat pattern also includes a collar liner that is coupled with the flat upper at an ankle opening. The collar liner has an interior surface and an opposite exterior surface. The exterior surface forms an exposed surface of the internal cavity of the dimensional shoe and the interior surface faces the flat upper bottom surface within the internal cavity of the dimensional shoe. However, the collar liner external surface faces the flat upper top surface at an ankle opening coupling location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWING

Illustrative aspects of the present invention are described in detail below with reference to the attached drawing figures, which are incorporated by reference herein and wherein:

FIG. 14 depicts a formed dimensional shoe from the flat pattern upper of FIG. 3-9, in accordance with aspects hereof;

FIG. 15 depicts a simplified cross section view of the ankle collar, in accordance with aspects hereof;

FIG. 16 depicts a flow diagram representing a method of manufacturing an article of footwear having an overlay from a flat pattern, in accordance with aspects hereof;

FIG. 17 depicts a flow diagram representing a method of manufacturing an article of footwear having an overlay from a flat pattern, in accordance with aspects hereof; and FIG. 18 depicts a flow diagram representing a method of manufacturing an article of footwear having an integrated collar liner to a flat pattern upper, in accordance with aspects hereof.

DETAILED DESCRIPTION OF THE INVENTION

Figure 1:
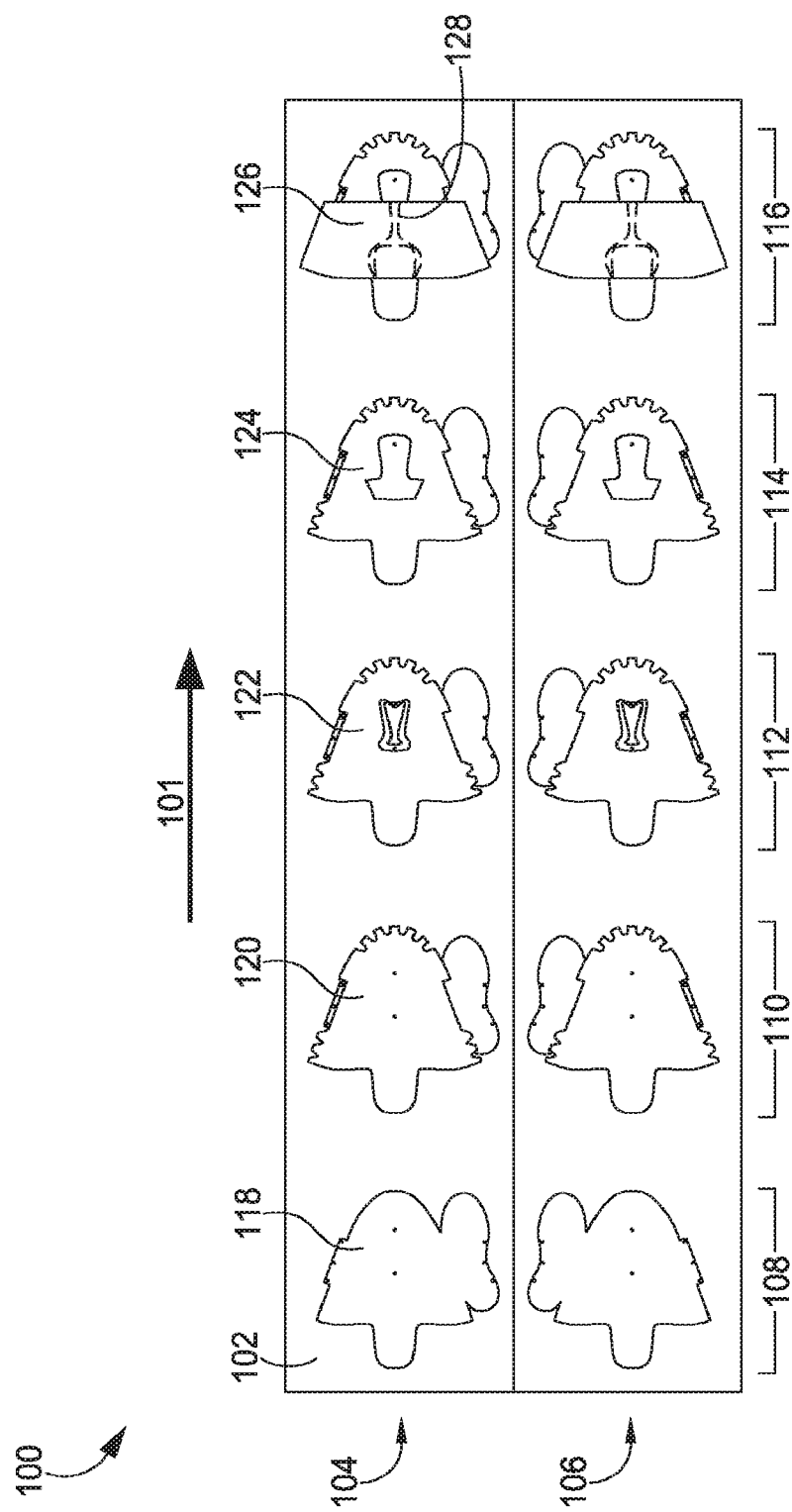
FIG. 1 depicts a continuous in-line production on a substrate of a series of shoe uppers, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Aspects hereof relate to the continuous in-line manufacturing of articles of footwear.

A first aspect relates to an article of footwear flat pattern upper having an upper portion and a footbed portion. The upper portion and the footbed portion are integrally coextensive, such that the upper portion lateral side converges with the footbed lateral side. The footbed portion includes a concave edge extending between the footbed toe end and the footbed heel end along the footbed medial side and a plurality of forming apertures along the medial side. The upper portion also includes a plurality of forming apertures extending along the medial side.

A second aspect relates to an article of footwear flat pattern upper portion. The upper portion has a midline reference line extending between the toe end apex and a midpoint on the heel end. The upper portion also is comprised of an origin aperture that is located within 10 millimeters of the midline reference line between the toe end and the heel end of the upper portion. The upper portion is also formed with an overlay that is coupled with the upper portion between the toe end and the heel end and between the medial side and the lateral side. The overlay has an alignment aperture that is aligned with the origin aperture.

A third aspect relates to a method of manufacturing an article of footwear from a flat pattern. The method includes cutting a first cut in a first material through the top surface and the bottom surface of the first material. The method continues with coupling an overlay on the first material top surface such that the overlay extends over the first cut and obscures the first material top surface. The method continues with forming the flat pattern having the first material with the first cut and the overlay into a dimensional article of footwear configured to receive a foot. The first material bottom surface is more interior to the dimensional article of footwear than the top surface.

A fourth aspect relates to an article of footwear flat pattern with an integrated collar liner. The flat pattern has a flat upper with a top surface forming an exterior of a dimensional shoe and a bottom surface facing an internal cavity of the dimensional shoe. The flat pattern also includes a collar liner that is coupled with the flat upper at an ankle opening. The collar liner has an interior surface and an opposite exterior surface. The exterior surface forms an exposed surface of the internal cavity of the dimensional shoe and the interior surface faces the flat upper bottom surface within the internal cavity of the dimensional shoe. However, the collar liner external surface faces the flat upper top surface at an ankle opening coupling location.

Articles of footwear may include shoes, boots, sandals, and the like. The term "shoe" will be used herein to generically reference an article of footwear. It is understood that the term "shoe" is not limited to a traditional style of a shoe, but instead may include a boot, athletic shoe, sandal, running shoe, cleat, and other articles of footwear. Generally, a shoe is comprised of a ground-contacting portion, which may be referred to as a sole. The sole may be formed from a variety of materials and/or a variety of individual components. For example, a sole may comprise an outsole, a midsole, and/or and insole, as is known in the art. The shoe may also be comprised of a foot-securing portion that is effective to secure a user's foot to the sole. The foot-securing portion may be referred to as a shoe upper, or "upper" for short herein. An upper may be formed from one or more materials and/or one or more individual components. An exemplary system and technique for forming an upper is provided hereinafter in greater detail.

Regardless of the materials or techniques for forming the upper and/or sole, additional shaping and forming may be used to obtain a desired three-dimensional shape (e.g., a dimensional shoe). Traditionally, a tooling known as a cobbler's last serves as a shape about which a shoe may be formed to a desired size, shape, and construction. As used herein, the term "last" will reference a tool form about which an upper may be formed. In some aspects, a sole may be coupled (e.g., adhered, stitched) to the upper as the upper is lasted (i.e., having the last positioned in an interior volume of the upper). The last may define the contours, shape, style, and other characteristics of a resulting shoe.

Aspects herein contemplate a flat pattern that is then formed into a dimensional shoe. A "flat pattern" is a substantially planar collection of materials as generally depicted in FIGS. 3-9. While the different materials may be coupled to one another in a manner that form textures, bumps, embossing, protrusions, and the like, the collection of materials is still substantially planar and therefore, "flat" even with the deviations in height along a surface. The flat pattern, when formed about a last to create a receiving cavity in which a user's foot may be secured, becomes a "dimensional" article. For example, a three-dimensional article of footwear is an article that is formed in a manner that can be secured to and around a portion of a wearer. A "flat" pattern, in contrast to a "dimensional" article, is not formed to be received about a portion of a wearer, in an exemplary aspect. The concept of a flat pattern is conducive to manufacturing as many materials used to form a shoe upper are rolled goods that are in a substantially planar (e.g., sheet-like) configuration in their raw state. Therefore, construction of a shoe upper from a collection of flat components may be automated for a continuous in-line manufacturing process as a flat pattern that is later converted into a dimensional article, such as through the use of a last or bespoke tooling.

At a high level, aspects contemplate forming a shoe upper in a continuous in-line manufacturing process that allows for varied style, size, and/or materials for each of the shoe upper portions formed as part of the in-line manufacturing. It is contemplated that the manufacturing may be automated such that one or more processes along the continuous line is performed by machines that are programmed to complete a specific series of tasks. Additionally or alternatively, it is contemplated that one or more processes of the manufacturing line are performed by a human. Therefore, any combination of machine and human involvement may be implemented to achieve the formation of a shoe upper and potential completion of the shoe as a whole, in exemplary aspects.

Continuous in-line manufacturing allows for strategic implementation of engineered material properties, such as tensile strength, elongation characteristics, and moisture transportation in an efficient manner on a flat pattern. The flat pattern concept may provide for greater consistency of manufacturing and ability to implement less sophisticated machines and logic to perform portions of the manufacturing process relative to a dimensional upper manufacturing process.

Manufacturing System

Figure 2:
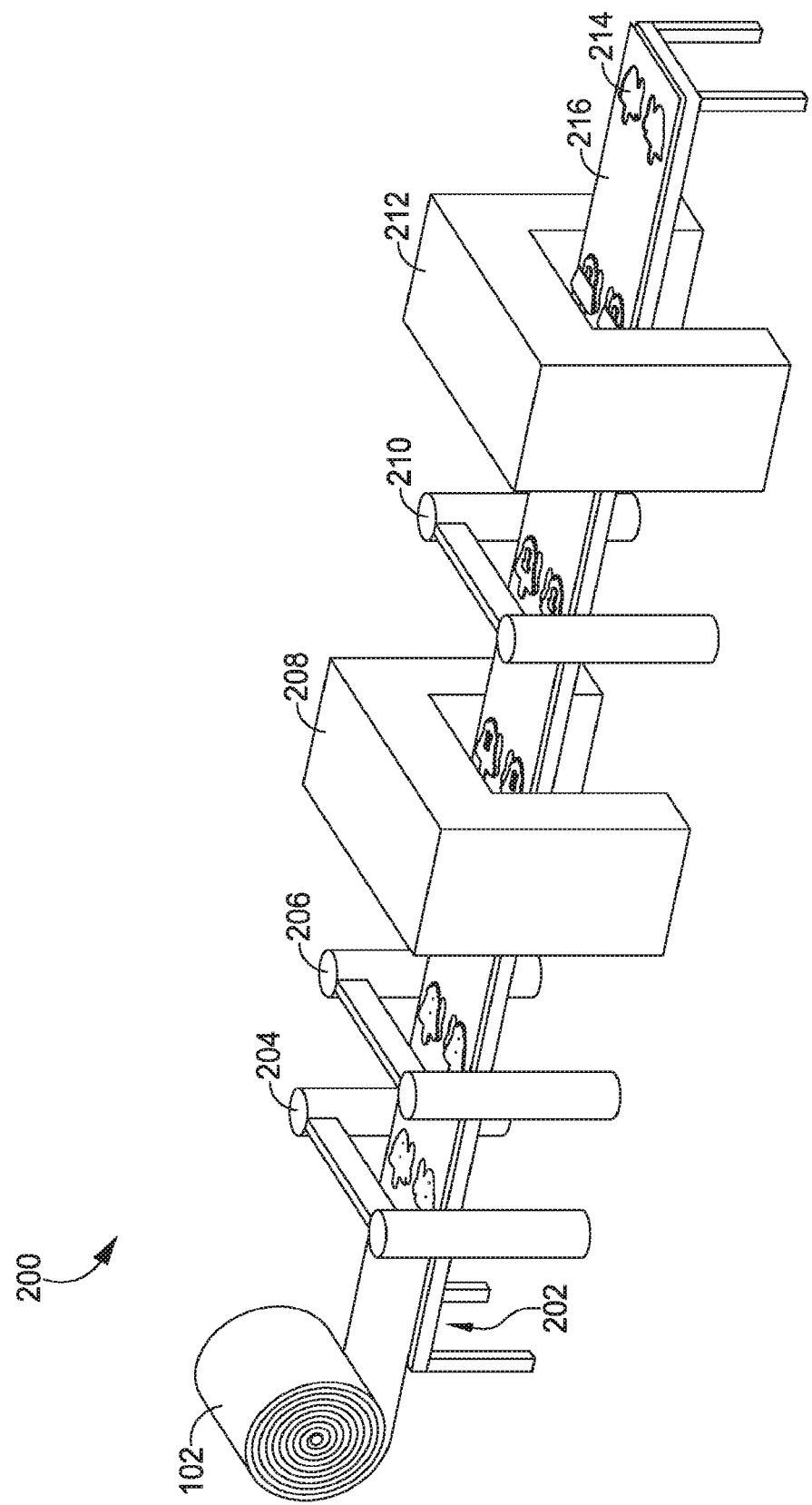
FIG. 2 depicts the substrate of FIG. 1 passing along a series of manufacturing processing stations forming the continuous in-line manufacturing system for a shoe upper, in accordance with aspects hereof.

FIGS. 1 and 2 provide an overview of continuous in-line manufacturing of a shoe upper, in accordance with aspects hereof. FIG. 1, in particular, depicts a continuous in-line production 100 on a substrate 102 of a series of uppers 118, 120, 122, 124, and 126, in accordance with aspects hereof. The substrate 102, in an exemplary aspect, serves as a foundation on which flat uppers may be formed. The substrate 102, in an exemplary aspect, has minimal stretch that allows for a registration of position of materials applied thereon. For example, a system may track the location of the substrate 102 as it passes through the in-line manufacturing process. Knowledge of the substrate position may provide guidance of what and where processes should be performed on the substrate to generate a flat pattern upper portion, in an exemplary aspect. The substrate 102 may be of any width and/or of any length. In an exemplary aspect, the substrate 102 is a rolled good that has a width sufficient to form at least one, two, three, four, five, or six shoe upper flat patterns across the width. As depicted in FIG. 1, the substrate 102 has a width sufficient to form at least two flat pattern uppers, as depicted by grouping 104 and 106. In an exemplary aspect, grouping 104 and grouping 106 represent matched uppers to form a pair of shoe. Exemplary groupings 108, 110, 112, 114, and 116 may represent right and left pairings of flat uppers that will be coordinated shoes upon completion. Each of the groupings may represent a different style, shape, configuration, or other deviation of shoe upper from the next groupings. For example, grouping 108 may represent a female running shoe upper while grouping 110 may represent a male baseball cleat upper, in an exemplary aspect. Further, it is contemplated that each of the groupings may represent a common size, shape, and style of shoe upper, in an alternative exemplary aspect.

The substrate 102 may be any material; however, in an exemplary aspect, the substrate 102 is a sheet material. For example, the substrate 102 may be a nonwoven fabric that is a sheet or web-like structure formed through entanglement of fibers/filaments by mechanical, thermal, and/or chemical processes. A nonwoven material may be a flat, porous material that is neither woven nor knit. A nonwoven material may be formed from recycled materials, such as scrap materials generated from the in-line manufacturing process itself.

A nonwoven may be a web material, such as an industrial felt, that is fabricated by a needle felting of polyester fibers. It is contemplated that the substrate 102, as a nonwoven or other material (e.g., woven/knit), may be formed from any synthetic or natural fibers. In an exemplary aspect, the fibers may be captured from the manufacturing process itself as part of a waste stream. For example, portions of the substrate 102 not forming an upper may be included in the waste stream following the formation of the shoe upper. The waste stream substrate 102 portions may be recycled to again form the substrate 102 for a subsequent manufacturing process, in an exemplary aspect. A nonwoven substrate 102 may provide greater economic efficiencies when contemplating recycling of waste stream materials relative to a knit or woven structure that have specific engineered structures (e.g., interlacing, looping) as opposed to random entanglement of fibers forming a nonwoven material, in an exemplary aspect.

The substrate 102 may alternatively be formed from a woven or knit material. For example, it is contemplated that the substrate 102 may be formed from an in-line knit or woven material such that the substrate begins as a yarn, fiber, thread or other raw material and is then formed into a sheet-like format as part of the in-line manufacturing process. Alternatively, it is contemplated that the substrate 102 is formed in a sheet-like format by knitting or weaving prior to being introduced with the in-line continuous manufacturing process.

Returning to FIG. 1, the substrate 102 depicts a series of manufacturing processes being implemented on the successive groupings of uppers in a direction indicated by arrow 101. For example, the upper 118 of group 108 is depicted having an outline of a flat pattern shape and a series of apertures, as will be discussed in greater detail at FIGS. 3-9. The substrate 102 progresses to another process at grouping 110 having the upper 120. The upper 120 may have an overlay (e.g., overlay 500 of FIG. 5 hereinafter) applied thereon that provides desired mechanical and/or aesthetic properties to the flat upper. The progression continues to the grouping 112 having the upper 122 with another overlay (e.g., eye stay overlay 600 of FIG. 6 hereinafter) applied thereon. The in-line manufacturing on the continuous roll of substrate 102 may continue to grouping 114 having upper 124 where another overlay (e.g., midfoot overlay 700 of FIG. 7 hereinafter) is applied to the flat pattern of upper 124. Finally, in the depicted exemplary sequence of in-line manufacturing processes, another overlay (e.g., collar liner 800 of FIG. 8 hereinafter) is applied to the flat pattern upper 126 of grouping 116. In this process, a stitching 128 is depicted, as will also be discussed in greater detail with FIG. 8.

While the specific components and processes are depicted in connection with FIG. 1, it is understood that any processes (e.g., cutting, coupling, painting, printing, applying, forming, and the like) may be performed in any sequence in any number, in accordance with aspects hereof. Further, while specific components are depicted, it is contemplated that any combination, shape, ordering, material, and/or configuration of components may be implemented, in exemplary aspects.

Directional terms are used herein to provide relative positioning of one or more features. For example, toeward or toewardly describe a direction towards the toe end of a component. Similarly, heelward or heelwardly describes a direction toward the heel end of a component. Medial and lateral are directional terms relative to a formed dimensional shoe as worn by a user. For example, the medial side is toward an inner portion relative to a body midline of a user's foot when worn, and the lateral side is toward an outer portion relative to the body midline of the user's foot when worn.

FIG. 2 depicts the substrate 102 progressing along a series of manufacturing processing stations forming the continuous in-line manufacturing system 200 for a shoe upper, in accordance with aspects hereof. In particular, the system 200 is comprised of a conveyance system 202 and a series of processing stations 204, 206, 208, 210, and 212. The conveyance system 202 and the processing stations are exemplary in nature and merely intended to illustrate a continuous in-line manufacturing system. It is understood that different systems and stations may be implemented in any combination, spacing, sequence, and configuration to accomplish aspects provided herein. Exemplary processing stations may include, but are not limited to, printing station, liquid applying stations, heat stations, steam stations, cutting stations, punching stations, placing stations, sewing stations, adhesive stations, welding stations, and the like. Further, it is contemplated that one or more stations may be combined into a common station that performs two or more operations in a common location and/or concurrently. Further, it is contemplated that one or more stations may be human occupied, such that the operation is performed by a human absent or in connection with a machine.

FIGS. 3-9 depict a sequence of exemplary processes that may be performed by one or more stations of the system 200, in an exemplary aspect. However, the specific flat pattern upper formed from the system will vary from the illustrative example(s) provided herein. The flexibility of the system 200, by design, allows for the varied manufacturing of different flat uppers without material change to the system 200 configuration. Instead, it is contemplated that one or more stations may be activated or deactivated depending on a particular flat pattern upper passing there through. For example, it is contemplated that a first upper may utilize a printing station to add printed elements thereon while a subsequent upper formed on the same continuous substrate 102 does not utilize the printer station as the subsequent upper is of a different style. Similarly, it is contemplated that a first upper utilizes a station to perform a first task (e.g., particular cutting pattern, a particular stitching pattern, a particular adhering pattern, a particular printing pattern) while a subsequent upper of a different style/configuration also uses the processing station, but for a different task (e.g., a different particular cutting pattern, a different particular stitching pattern, a different particular adhering pattern, a different particular printing pattern).

It is contemplated that one or more identifiers may be used to inform the system 200 of what operations should be performed for a given flat pattern upper. For example, it is contemplated that a vision recognition system may be used at one or more of the processing stations to identify a particular flat pattern upper based on the flat upper component, a marking (e.g., barcode, QR code), or other visually detectable feature. It is also contemplated that a radio frequency identification technology may be implemented to identify a flat pattern upper at one or more of the processing stations. For example, it is contemplated that a radio frequency identification (RFID) technology may be leveraged. Other technologies are contemplated as well, such as embedded reactive fibers that react to one or more stimuli (e.g., electromagnetic energy). Additionally, it is contemplated that a position of a flat pattern on the substrate may be registered such that as the substrate 102 progresses to a known location/distance, a particular flat pattern upper formed thereon is also known. State differently, in an aspect, a low modulus of elasticity associated with a continuous substrate may provide sufficient accuracy for knowing a location of a flat upper being formed thereon as it progresses through the system 200. It is further contemplated that two or more identification systems may be implemented in combination to assist in the manufacturing of uppers in a continuous in-line system.

As depicted in FIG. 2, it is contemplated that the system 200 may progress until a flat pattern upper is removed from the continuous roll of substrate 102. As such, it is contemplated that a portion of the substrate 102 forms a portion of the removed upper. FIG. 2 depicts an extracted flat pattern upper outline 214 from the substrate 102. A remainder of waste stream is depicted by portion 216 of the substrate 102. The portion 216 may be recycled for use within another portion of a substrate for subsequent forming of an upper, in an exemplary aspect.

Figure 3:
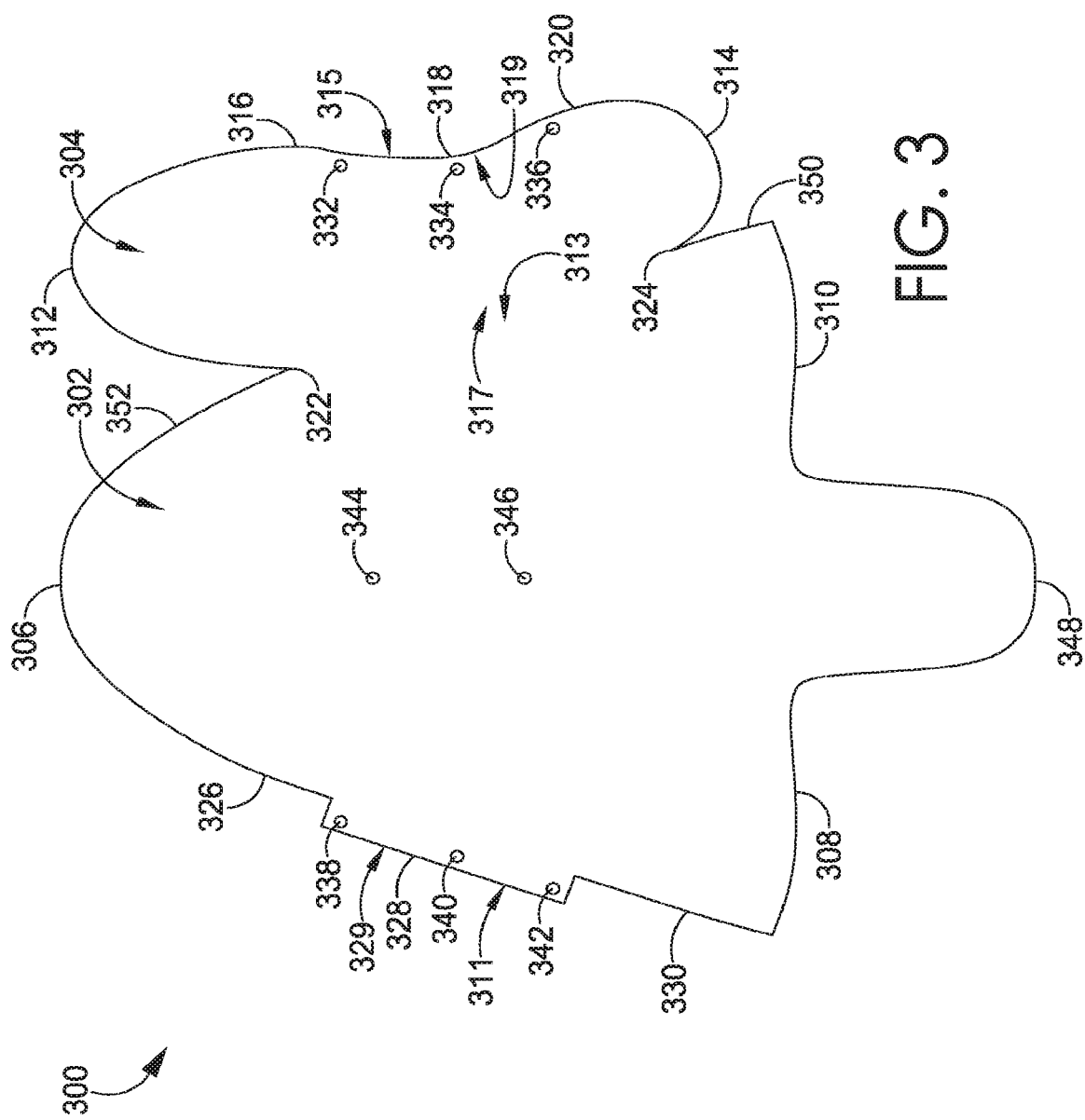
FIG. 3 depicts a flat pattern upper formed from a substrate, in accordance with aspects hereof.

FIGS. 3-9 depict an exemplary sequence of forming a flat pattern upper 300, in accordance with aspects hereof. It should be noted that the flat pattern upper 300 may be part of a continuous substrate, such as a roll of nonwoven material depicted in FIGS. 1 and/or 2. Therefore, while an outer perimeter is depicted in FIGS. 3-9 for the substrate layer, in actuality no such perimeter may be demarcated until the flat pattern upper 300 is removed from the greater collection of substrate materials. Alternatively, it is contemplated that the substrate is cut to shape prior to (or during) one or more manufacturing processes prior to completion of subsequent processes to be performed on the flat pattern upper 300, in an exemplary aspect. In this alternative contemplation, the depicted perimeter of FIG. 3 may represent an edge of the substrate material onto which the flat pattern upper 300 is formed. Additionally, as previously provided, the shape, size, and configuration of the components (e.g., substrate of FIG. 3 forming the flat pattern upper 300) may deviate and the provided representations are illustrative in nature. For example, it is contemplated that a footbed portion 304 may be divided such that a portion is on an upper medial side 311 of an upper portion 302 and another portion of the footbed portion may be on an upper lateral side 313 of the upper portion 302, in an exemplary aspect. Further, it is contemplated in alternative aspects the flat pattern upper is formed without a coextensive footbed portion. Further, while a nested tongue is depicted in FIG. 3 extending from an upper heel end 348, such a feature may be omitted in aspects without departing from the scope of the disclosure hereof. Therefore, alternative configurations, shapes, styles, and orientations of one or more features of the flat pattern upper are contemplated and not limited to the exemplary illustrations hereof.

Substrate as a Flat Pattern Upper

Turning to FIG. 3 specifically, the flat pattern upper 300 is depicted, in accordance with aspects hereof. The flat pattern upper 300 is comprised of the upper portion 302 and a coextensive footbed portion 304. The term "coextensive" as used herein denotes a portion that is contiguous with another portion in an integral manner. For example, the upper portion 302 is formed from a common contiguous material (e.g., the substrate 102 of FIG. 1) as the footbed portion 304. The material forming each of the coextensive portions are integral with one another such that the portions converge together and are not subsequently joined together by welding, adhering, or stitching, for example.

The upper portion is comprised of an upper toe end 306 forming a convex edge and an upper heel end 348. The upper heel end 348 may be further defined by an upper medial heel end 308 and an upper lateral heel end 310. The upper portion 302 is further comprised of the upper medial side 311 and an opposite upper lateral side 313. The upper medial side 311 may further be defined by a toeward medial edge 326, a medial flap edge 329, and a heelward medial edge 330, in the illustrated example. Further, the upper portion 302 is comprised of a medial flap 328, which will be discussed in greater detail hereinafter. The upper lateral side 313 may be further defined by a toeward lateral edge 352 and a heelward lateral edge 350. As will also be discussed hereinafter, the upper portion 302 is coextensive with the footbed portion 304 proximate at least a portion of the upper lateral side 313, in the illustrated aspect.

The footbed portion 304 is comprised of a footbed toe end 312, a footbed heel end 314, a footbed lateral side 317, and a footbed medial side 315. The footbed medial side 315 may be further defined by a toe end apex 316, a nadir 318, and a heel end apex 320. The toe end apex 316, nadir 318, and heel end apex 320 define a concave edge 319 of the medial side 315.

Converting a flat pattern upper 300 into a dimensional shoe having an appropriate shape and comfort may implement a divergence of the coextensive upper portion 302 and footbed portion 304 at one or more of the heel end or toe end. For example, an intersection 322 is formed at the intersection of the toeward lateral edge 352 and the lateral side 317 of the footbed portion 304. An acute angle is formed at the intersection 322 between the upper portion 302 and the footbed portion 304. The acute angle allows for an acceptable forming of dimensional footwear having a curved compound surface proximate a toe end (e.g., toe box) of an article of footwear. An obtuse angle, in an exemplary, aspect may not facilitate converting a flat pattern upper into a dimensional article of footwear having coextensive upper and footbed portions, in an exemplary aspect. Similarly towards a heel end, the flat pattern upper 300 forms an intersection 324 at the intersection of the heelward lateral edge 350 and the lateral side 317 near the heel end 314 of the footbed portion 304. An acute angle is formed at the intersection 324 between the upper portion 302 and the footbed portion 304. For reasons discussed with the toewardly acute angle, similar benefits may be realized with an acute angle heelwardly between an upper and footbed portions, in exemplary aspects.

As will be illustrated in FIGS. 10-13 hereinafter, forming a dimensional shoe from the flat pattern upper 300 may leverage one or more forming apertures to allow appropriate registration and alignment between the upper and footbed portions, in accordance with aspects hereof. It is contemplated that any number of apertures may be utilized in any location and of any size. FIG. 3 depicts an exemplary configuration of apertures; however, a fewer number of apertures, a different arrangement of apertures, and/or a different size of apertures may be implemented. For example, it is contemplated that a single aperture on the footbed portion 304 and a single aperture on the upper portion 302 may be used to form a flat pattern upper into a dimensional shoe. It is also contemplated that two apertures associated with the footbed portion 304 and two aperture associated with the upper portion 302 may be used to form a flat pattern upper into a dimensional shoe. Additionally, as depicted, it is contemplated that three or more apertures on both of the upper and footbed portions may be used to form a flat pattern upper into a dimensional shoe, in exemplary aspects.

The footbed portion 304 is depicted as having a footbed first aperture 334, a footbed second aperture 332, and a footbed third aperture 336. The upper portion 302 is depicted as having an upper first aperture 340, and upper second aperture 338, and an upper third aperture 342. As will be illustrated in FIGS. 10-13, it is contemplated that the similarly named apertures of the footbed and upper portions are aligned to their respective counterpart-named apertures to appropriately align the flat pattern upper 300 when formed into a dimensional shoe. These apertures useful in aligning portions of the flat pattern upper 300 will be discussed in greater detail in FIGS. 4 and 10-13 hereinafter.

Another aperture type is also depicted in the flat pattern upper 300. An origin 344 and a second origin 346 are depicted within the upper portion 302. As will be discussed hereinafter, the origin apertures provide an alignment indicator for one or more subsequent components (e.g., overlays), features (e.g., adhesive, print), cutting, and/or other processes performed on the flat pattern upper 300. For example, the origin(s) may provide for physical registration of an overlay such that a pin extends through an origin of the substrate and also extends through an alignment aperture of the overlay to ensure appropriate positioning of the overlay relative to the substrate. As will be discussed in FIG. 4, the origin aperture(s) may be positioned at any location on or near the flat pattern upper 300, in exemplary aspects. However, in a specific configuration, an origin aperture is formed within a midfoot opening region (e.g., a midfoot opening region 901 of FIG. 9), such as a throat between athletic shoe opposing eyebrows. By positioning the origin(s) within the midfoot opening region, the origin(s) may be centrally located within the upper portion 302 and also be removed when the midfoot opening is formed. Stated differently, locating the origin(s) within a location to be removed as waste stream following one or more operations allows the origins to serve an intended purpose during in-line manufacturing while not interfering with a final dimensional shoe, in an exemplary aspect.

As previously discussed, the flat pattern upper 300 of FIG. 3 is illustrative in nature and is not limiting as to concepts provided herein. For example, alternative sizing, shaping, and orientations are contemplated within the scope of features provided herein.

Reference Lines

Figure 4:
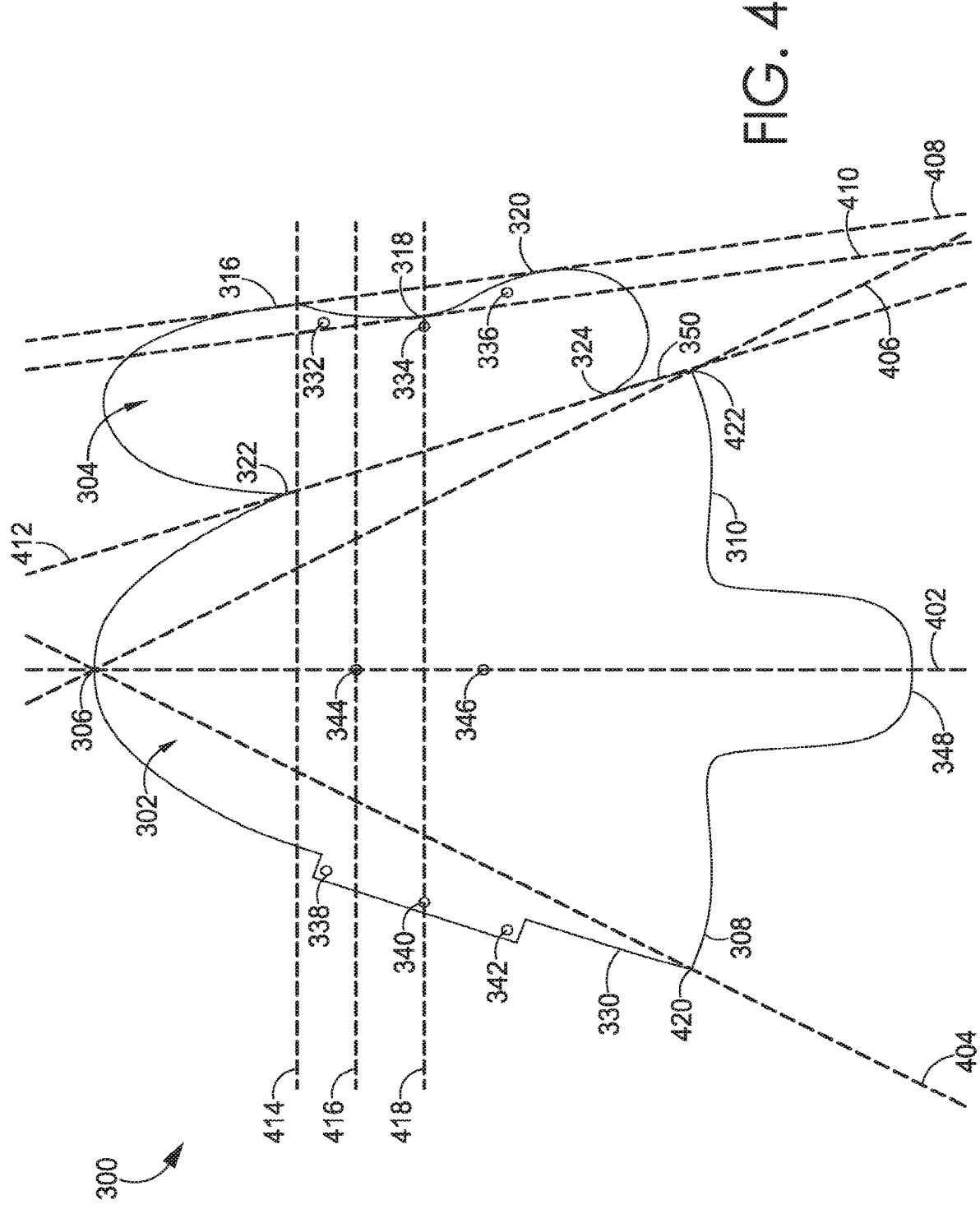
FIG. 4 depicts the flat pattern upper of FIG. 3 having a plurality of illustrative reference lines, in accordance with aspects hereof.

Turning to FIG. 4 that depicts the flat pattern upper 300 of FIG. 3 having a plurality of illustrative reference lines, in accordance with aspects hereof. The illustrated reference lines are merely demonstrative and are not necessarily visible demarcations. Therefore, it is contemplated that a flat pattern upper 300 in an in-line manufacturing process would not actually depict the reference lines of FIG. 4. Instead, the reference line of FIG. 4 may be determined from the following discussion.

An upper midline 402 is depicted extending between the upper toe end 306 and the upper heel end 348. Specifically, it is contemplated that the upper midline 402 extends through an apex of the upper toe end 306, in an exemplary aspect. The upper midline 402 is also contemplated as extending through the upper heel end 348 at a location equidistant between a medial heel intersection 420 and a lateral heel intersection 422. The medial heel intersection 420 is formed at the intersection of upper heelward medial edge 330 and the upper medial heel end 308. The lateral heel intersection 422 is formed at the intersection of the heelward lateral edge 350 and the upper lateral heel end 310. As the shape and configuration of the flat pattern upper may be variable among styles, the medial heel intersection 420 may be positioned at an outer-most location of intersection between a medial side and a heel end of an upper portion. Similarly, as the shape and configuration of the flat pattern upper may be variable among styles, the lateral heel intersection 422 may be positioned at an outer-most location of intersection between a lateral side and a heel end of an upper portion.

A medial reference line 404 is depicted extending from the medial heel intersection 420 to an intersection of the upper midline 402 and the toe end 306. A lateral reference line 406 is depicted extending from the lateral heel intersection 422 to the intersection of the upper midline 402 and the toe end 306.

A first reference line 408 is depicted extending between the toe end apex 316 and the heel end apex 320 of the footbed portion 304. A second reference line 410 is depicted a extending through the nadir 318 and parallel to the first reference line 408.

A portion intersection line 412 is depicted extending through the intersection 322 and through the intersection 324. In an exemplary aspect, the portion intersection line 412 demarks the upper lateral side 313 and the footbed lateral side 317 where the portions are coextensive, in an exemplary aspect. It is contemplated that in alternative configurations of the flat upper pattern having a part of the footbed portion also on the upper medial side 311 that a second portion intersection line (not shown) may be formed between the intersection of the upper and a medial-side footbed portion, for example.

A third reference line 414 is depicted extending perpendicular to the upper midline 402 and extending through the intersection 322. A fourth reference line 418 is depicted extending perpendicular to the upper midline 402 and passing through the nadir 318 of the footbed portion 304. A fifth reference line 416 is depicted as extending perpendicular to the upper midline 402 and between the third reference line 414 and the fourth reference line 418. In an exemplary aspect, the fifth reference line 415 extends along a ball width of the flat pattern upper 300 when formed about a last, in an exemplary aspect.

Forming Apertures

As previously introduced in connection with FIG. 3, the flat pattern upper 300 is comprised of two or more apertures effective to align the upper portion 302 with the footbed portion 304 when being formed into a dimensional shoe. The footbed portion 304 is comprised of the footbed first aperture 334, the footbed second aperture 332, and the footbed third aperture 336. The upper portion 302 is comprised of the upper first aperture 340, the upper second aperture 338, and the upper third aperture 342. As previously discussed, any number of forming apertures is contemplated.

The footbed first aperture 334 is proximate the medial edge near the nadir 318. In an exemplary aspect, the footbed first aperture 334 is within 20 millimeters ("mm") of the fifth reference line 416 and within 20 mm of the footbed medial edge. In another exemplary aspect, the footbed first aperture is within 20 mm of the nadir 318. The position of the footbed first aperture 334 provides for acceptable alignment of the flat pattern upper 300 portions as the proximity to the nadir 318 exerts tension forces on the flat pattern upper 300 when formed about a last. Further, it is contemplated that the footbed second aperture 332 is positioned between the first reference line 408 and the second reference line 410, in an exemplary aspect.

The footbed second aperture 332 is proximate the footbed medial edge between the toe end apex 316 and the nadir 318, in an exemplary aspect. Specifically, it is contemplated that the footbed second aperture 332 is proximate the concave edge of the footbed portion 304 by less than 20 mm. In an exemplary aspect, the footbed second aperture 332 is between the third reference line 414 and the fifth reference line 416. In yet another exemplary aspect, the footbed second aperture is within 20 mm of the third reference line 414 and/or the fifth reference line 416. The position of the footbed second aperture 332 provides alignment proximate the ball width of the dimensional shoe where a last may exert tensioning forces at an apex of a compound curve formed by the last.

The footbed third aperture 336 is positioned between the footbed first aperture 334 and the footbed heel end, in an exemplary aspect. Further, it is contemplated that the footbed third aperture 336 is within 20 mm of the footbed medial side. In an additional aspect, it is contemplated that the footbed third aperture 336 is positioned between the nadir 318 and the heel end apex 320 proximate the medial side of the footbed portion 304, in an exemplary aspect. It is contemplated that the footbed third aperture 336 is positioned between the first reference line 408 and the second reference line 410, in an exemplary aspect.

The forming apertures on the upper portion 302 previously introduced include the upper first aperture 340, the upper second aperture 338, and the upper third aperture 342. However, as previously discussed, it is contemplated that any number of forming apertures may be present on the flat pattern upper. In particular, it is contemplated that two forming apertures are present on a first side (e.g., medial side of an upper portion) and two corresponding forming apertures on an opposite second side (e.g., medial side of a footbed portion).

The forming apertures of the upper portion 302 are depicted as being formed in the medial flap 328 of FIG. 3. The medial flap 328 may extend along the medial side of the upper portion 302 such that it is intended to overlap a part of the footbed portion 304 between the toe end apex 316 and the heel end apex 320. By overlapping within the convex region of the footbed portion medial edge, the medial flap 328 is positioned under an arch region of a wearer's foot when formed into a dimensional shoe. The overlapping of substrate in this region may be minimally detectable to the user and provide greater comfort than if the flap extends to the ball or heel of the user when formed in the dimensional shoe, in an exemplary aspect.

The upper first aperture 340 is positioned on the upper portion 302 proximate the medial edge. In an exemplary aspect, the upper first aperture 340 is positioned at the medial flap proximate the medial flap edge 329 of FIG. 3. For example, the upper first aperture 340 is within 20 mm of the medial edge. The upper first aperture 340 is proximate the fifth reference line 416, in an exemplary aspect. It is contemplated that the upper first aperture is within 20 mm of the fifth reference line 416, in an exemplary aspect.

The upper second aperture 338 is positioned on the upper portion 302 proximate the medial edge and between the upper first aperture 340 and the upper toe end 306, in an exemplary aspect. It is contemplated that the upper second aperture is positioned on the medial flap proximate the medial flap edge 329 of FIG. 3. The upper second aperture 338 may be positioned between the third reference line 414 and the fifth reference line 416, in an exemplary aspect. Further, it is contemplated that the upper second aperture 338 is within 20 mm of an outer edge, such as the medial flap edge 329 of FIG. 3.

The upper third aperture 342 is positioned on the upper proximate the medial edge and between the upper first aperture 340 and the upper medial heel end 308. In an exemplary aspect, the upper third aperture 342 is positioned on the medial flap heelwardly from the upper first aperture 340. It is also contemplated that the upper third aperture 342 is positioned within 20 mm of the upper portion 302 medial edge.

Having the various forming apertures within at least 20 mm of an edge allows sufficient substrate material to extend between the forming aperture and the edge to support the tensioning forces exerted on the substrate material during a forming (e.g., lasting) process while minimizing an amount of substrate material that overlaps. It is contemplated that more than 20 mm is utilized in exemplary aspects. Further, it is contemplated that substrate material extending between the forming aperture and an edge may be removed following a coupling (e.g., adhering, stitching, welding) of the upper portion 302 with the footbed portion 304, in exemplary aspects.

The utilization of the forming apertures will be illustrated in FIGS. 10-13 hereinafter to join the upper portion 302 with the footbed portion 304 to form a dimensional shoe around a last or other form. As such, it is contemplated that the position of the upper first aperture 340 and the footbed first aperture 334 are positioned such that when the upper portion 302 medial side is brought into proximity with the footbed portion 304 medial side and aligned by the first apertures, the flat pattern upper 300 forms appropriately to a last. Similarly, if utilized, the upper second aperture 338 and the footbed second aperture 332 are positioned such that when the upper portion 302 medial side is brought into proximity with the footbed portion 304 medial side and aligned by the second apertures, the flat pattern upper 300 forms appropriately to a last. The position of the upper third aperture 342 and the footbed third aperture 336 are similarly positioned to allow for appropriate forming of the flat pattern upper 302 into a dimensional shoe.

While the forming apertures are depicted as circular holes extending through the substrate material, it is contemplated that they may be any structure. In an exemplary aspect, the forming apertures are not even a hole that extends through the substrate, but instead a marking to indicate where an alignment pin (e.g., first alignment pin 1002 of FIG. 10) is to extend through the substrate, thus forming an aperture at least temporarily. Therefore, the forming apertures serve as a registration tools to ensure appropriate positioning of flat pattern upper portions when being formed into a dimensional shoe.

Origin

As previously introduced in FIG. 3, the origin 344 provides a location from which process and/or components may be oriented to ensure appropriate positioning and/or alignment. For example, as will be depicted in FIG. 5, an overlay 500 is positioned on the substrate material. The position of the overlay 500 is determined based on physical registration of the origin 344 with an alignment aperture 345 of the overlay 500. A combination of two or more origin apertures may be used in connection to provide both positional and rotational alignment between two or more components/layers. Further, it is contemplated that an origin, such as the origin 344 aperture, provides positional guidance for one or more processes to be performed. For example, through mechanical interaction with an origin and/or optical detection of the origin, a robotic member may perform a process contemplated herein (e.g., cutting, sewing, gluing, welding, positioning) on one or more parts of the flat pattern upper 300.

The origin 344 is positioned on the substrate between the upper toe end 306 and the upper heel end 348. In an exemplary aspect, the origin 344 is positioned within 10 mm of the upper midline 402. A 10 mm tolerance allows for the origin 344 to be maintained within a midfoot opening region (e.g., midfoot opening region 901 of FIG. 9) that will subsequently be removed from the flat pattern upper 300, in an exemplary aspect. As a result, the origin 344, in this example, can provide functional assistance to the formation of the flat pattern upper 300 without detracting from the finished dimensional shoe.

In an exemplary aspect, the origin 344 is positioned heelward of the third reference line 414. Further, in an exemplary aspect, the origin 344 is positioned toeward of the fourth reference line 418. It is contemplated that the origin is positioned between the third reference line 414 and the fourth reference line 418. It is also contemplated that the origin 344 is positioned within 10 mm of an intersection between the upper midline 402 and the fifth reference line 416. Further yet, it is contemplated that the origin 344 is positioned between the third reference line 414 and the fourth reference line 418 in a toe-to-heel direction and positioned between the medial reference line 404 and the lateral reference line 406 in a medial-to-lateral direction.

The second origin 346 is positioned between the origin 344 and the upper heel end 348, in an exemplary aspect. Further, it is contemplated that the second origin is within 10 mm of the upper midline 402, in an exemplary aspect. Further yet, it is contemplated that the second origin is positioned between the origin 344 and the upper heel end 348 in a toe-to-heel direction and between the medial reference line 404 and the lateral reference line 406 in a medial-to-lateral direction, in an exemplary aspect. Additionally or alternatively, it is contemplated that the second origin 346 is positioned on the flat pattern upper 300 within a midfoot opening region, such as the midfoot opening region 901 of FIG. 9.

As with the forming apertures, it is contemplated that the origin(s), while depicted as circular holes extending through the substrate, may instead be any shape or configuration. For example, an origin may be a visual marking through which an alignment pin extends for alignment of one or more overlays. The extension of the alignment pin through the substrate may, at least temporarily, form an aperture. Alternatively, a visual alignment based on the location of an origin formed as a visual marker is contemplated. Also, it is contemplated that any number of origins may be utilized in any configuration and in any location to achieve aspects contemplated herein.

Overlays and Precutting Obscured Materials

Figure 5:
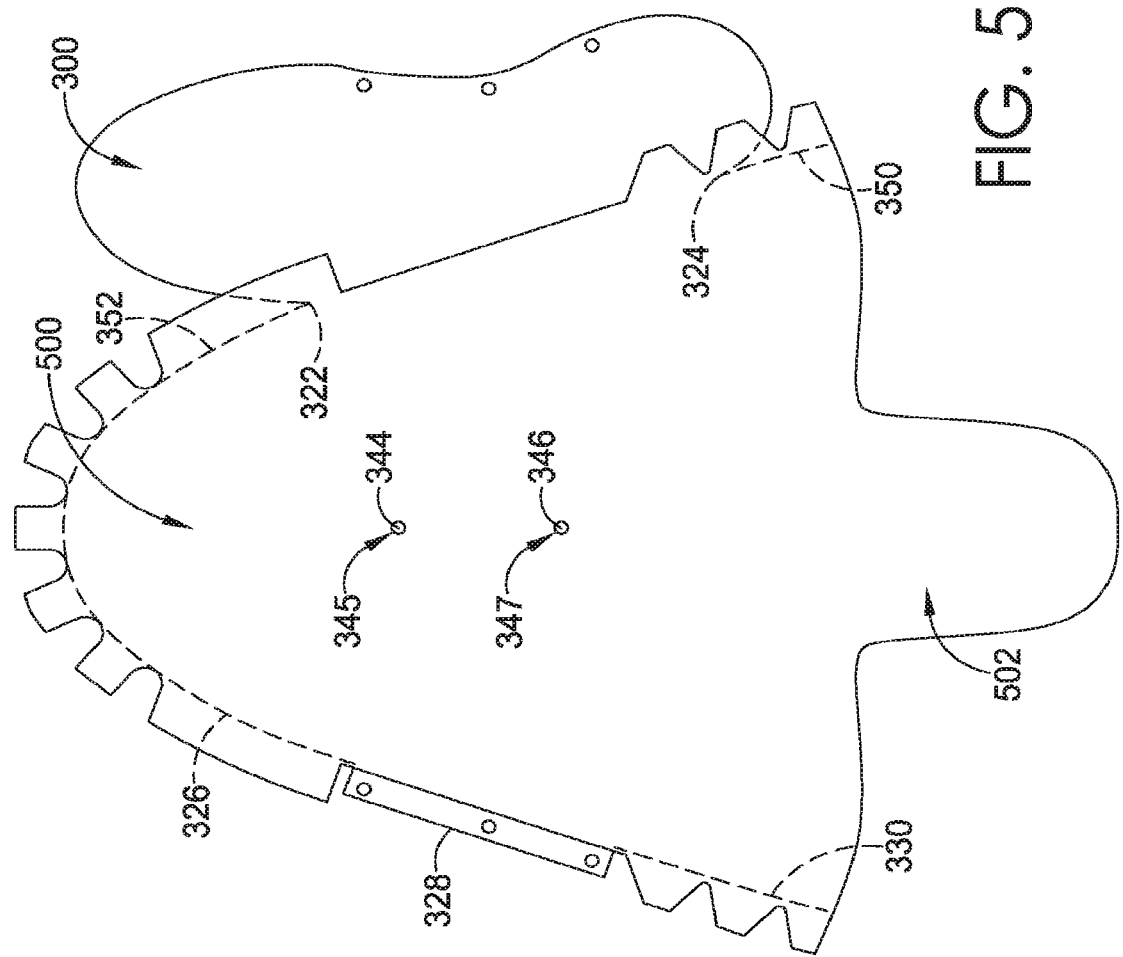
FIG. 5 depicts an exemplary overlay positioned on the substrate material forming the flat pattern upper of FIG. 3, in accordance with aspect hereof.

Turning to FIG. 5, an exemplary overlay 500 is positioned on the substrate material forming the flat pattern upper 300, in accordance with aspect hereof. The overlay 500 or any overlay may be formed from any material and may be of any shape, orientation, size, and/or position. In an exemplary aspect, the overlay 500 or any overlay is formed from a knit material. In an alternative exemplary aspect the overlay 500 or any overlay is formed from a woven material. In yet another alternative exemplary aspect, the overlay 500 or any overlay is formed from a sheet-like or film-like material. An overlay may be a cushioning element, a tensile element, a plastic element, a rubber element, or any material or functional portion in exemplary aspects. It is contemplated that the overlay 500 or any overlay may be formed from synthetic or natural materials. For example, an overlay may be formed from a polymer-based material, cotton-based material, wool-based material, leather-based material, and any other materials suitable for the construction of a shoe.

As previous discussed, the figures represent the flat pattern upper 300 having a solid perimeter for illustration purposes. However, if the flat pattern upper is formed from a substrate in a continuous manner, some of the perimeter elements of the flat pattern upper 300 substrate material may not be formed (e.g., cut) until one or more process have been performed on the substrate material (e.g., coupling of overlays, printing, cutting of midfoot opening, sewing). Delaying separating the substrate portion of the flat pattern upper 300 from the greater source of the substrate allows the flat pattern upper to remain in a known relative location of the greater substrate material as it passes through a continuous in-line manufacturing system, such as that depicted in FIGS. 1 and 2 discussed previously.

However, as materials may be layered on other materials, such as the substrate, processes, such as cutting, are performed prior to obscuring the to-be-processed material. For example, FIG. 5 depicts the substrate material portion of the flat pattern upper 300 with solid-line perimeter markings where the substrate is not obscured by the overlay 500. However, those portions of the substrate that are obscured by the overlaying and overlapping of the overlay 500 are depicted in dashed lines. For example, the heelward medial edge 330, the toeward medial edge 326, the toeward lateral edge 352, the heelward lateral edge 350, and portions of the footbed lateral edge extending from intersections (e.g., intersection 322, 324) with the upper portion are all depicted in dashed lines.

It is contemplated that prior to placing the overlay 500 on the substrate material, a cutting process is performed to cut the substrate at the dashed lines of the heelward medial edge 330, the toeward medial 326, the toeward lateral edge 352, the heelward lateral edge 350, and portions of the footbed lateral edge. As the flat pattern upper 300 is extending through a continuous in-line manufacturing system in a substantially planar manner, cutting of obscured portions of material may include displacing or moving the overlay subsequent to aligning the overlay, which could disturb the alignment. Therefore, prior to placing and potentially securing the overlay, obscured portions of an underlying material (e.g., substrate) are cut to limit moving of an overlay once aligned on the underlying material.

Turning briefly to FIG. 17 illustrating a flow diagram 1700 representing a method of manufacturing an article of footwear having an overlay from a flat pattern, in accordance with aspects hereof. At a first block 1702, a first cut is made into a first material having a top surface and an opposite bottom surface. The first cut extends through the top surface and the bottom surface. The first material may be any material, such as a substrate or another layer (e.g., an additional overlay) of a flat pattern upper. For example, a cut may be made through a substrate. The substrate having both a top surface and an opposite bottom surface. The first cut may be made through any means, such as a knife, a die, a punch, a laser, a water jet, an air jet, a media jet, a hot edge, and the like as is known in the art. The cut may be linear, such as defining, at least a portion of, a perimeter, such as a perimeter of a footbed portion or a perimeter of an upper portion. The cut may form an aperture, such as an origin or forming aperture. The cut may be positioned at an internal location of the flat pattern upper or the cut may occur at a perimeter of the flat pattern upper, in an exemplary aspect.

At a block 1704, subsequent to cutting the first cut through the first material, an overlay is coupled on the first material top surface. The overlay extends over and obscures the first cut on the first material top surface. As a result, if the first cut was intended to be made after the overlay was positioned on the first material, at least a portion of the overlay would need to be re-positioned or otherwise moved to access the first material to make the first cut without also cutting the overlay. Therefore, the portions of the first material intended to be cut without also cutting a corresponding overlaying portion of an overlay are cut prior to placing the overlay on the first material. The coupling of the overlay to the first material may use sewing, adhering, welding, mechanical fastening, and the like to couple the overlay with the first material.

The first cut may be made at the acute angle formed at the intersection 322 and/or the intersection 324 of FIG. 5. As previously provided in FIG. 3, the acute angles may represent a flat pattern configuration allowing for the footbed portion and the upper portion to appropriately form around a tool, such as a last, while avoiding unintended deformation, wrinkling, and/or pucker of the substrate. However, it is contemplated that an overlay, such as overlay 500 of FIG. 5, obscures the acute angles at intersections 322 and/or 324 in order to form an aesthetically intended outer surface for the formed shoe, in an exemplary aspect.

In an exemplary aspect, the coupling of the overlay to the first material does not include a connection/coupling of the overlay and the first material at the first cut. Instead, it is contemplated that the first material may move independent of the overlay at the first cut. For example, as will be depicted in FIG. 12, a portion of the substrate that is precut before the overlay 500 is applied extends around a last at the precut portions to allow for forming of the substrate about the last. Therefore, to limit interference with the substrate securing and alignment about a last, the overlay is not secured at one or more of the precut locations.

In additional aspects, it is contemplated that the method depicted in flow diagram 1700 optionally includes cutting a second cut, the second cut extending through the first material and the overlay. The second cut may be formed following the block 1702. The second cut may be performed prior to or subsequent to the block 1704. The second cut is performed at a location that will be obscured by a second overlay extending over an overlay top surface 502 of FIG. 5 and the first material of the block 1702. It is also contemplated that the second overlay, in this optional aspect, is coupled with the overlay. The coupling may be of any manner, such as sewing, welding, adhering, and the like.

At a block 1706, the first material having the first cut is formed into a dimensional shoe. As indicated previously and as will be discussed with respect to FIGS. 12 and 13, it is contemplated that the flat pattern upper onto which the first cut may be made is formed into a dimensional shoe. The forming of the dimensional shoe may include wrapping a substrate material through which the first cut extends around a last or other forming tool. The first cut allows for the substrate to be removed from a greater source of the substrate (e.g., a continuous line of substrate) without cutting one or more overlays that extend beyond a perimeter of the substrate. Therefore, while the substrate may be cut to form around the last, the overlay(s) need not be cut at the same locations to allow an intended aesthetic finish that is not constrained by the intended shaping of the underlying substrate.

Returning to FIG. 5, the overlay 500 is positioned on the substrate forming the flat pattern upper 300. Appropriate positioning of the overlay relative to the flat pattern upper 300 is accomplished with the origin 344 and, in this example, the second origin 346 that are aligned with a first alignment aperture 345 and a second alignment aperture 347, respectively. The first alignment aperture 345 extends through the overlay 500 and is positioned on the overlay 500 to allow for appropriate positioning relative to the underlying material (e.g., substrate). Similarly, the second alignment aperture 347 extends through the overlay 500 and is positioned on the overlay 500 to allow for appropriate positioning relative to the underlying material (e.g., substrate).

As depicted in FIG. 5, the origin 344 and the first alignment aperture 345 align. Also depicted in FIG. 5 is the second origin 346 in alignment with the second alignment aperture 347. As previously provided, the use of origin apertures and alignment apertures provide for a mechanical alignment of two or more components during an in-line manufacturing process. However, it is contemplated that an origin aperture and an alignment aperture may be omitted in alternative aspects, such as when a continuous substrate (e.g., rolled good) forms a foundation of the flat pattern upper. In this example, it is contemplated that a known location of the continuous substrate provides positional information sufficient to align one or more overlay thereon.

Turning briefly to FIG. 16 illustrating a flow diagram 1600 representing a method of manufacturing an article of footwear having an overlay from a flat pattern, in accordance with aspects hereof. At a block 1602 an origin is formed extending through an upper portion of a flat pattern upper. The origin may be positioned in a midfoot opening region of the shoe. As previously provided, the origin may be formed from any suitable means, such as cutting, stamping, burning, and the like.

At a block 1604, an overlay having an alignment aperture is coupled with the upper portion, such as a substrate material. The overlay is aligned with the upper portion such that the alignment aperture and the origin are aligned such that a common member extends through each of the origin and alignment aperture. As previously provided, the overlay may be coupled by any suitable means, such as sewing, adhering, welding, and the like.

At a block 1606, a midfoot region opening is removed from the upper portion having the origin aperture. The midfoot region, such at the midfoot opening region 901 of FIG. 9, includes the origin aperture and once the overlay is coupled with the underlying material (e.g., substrate), the origin may no longer be needed and therefore can be removed with the midfoot opening region material.

At a block 1608, the upper portion having the overlay coupled thereto and the midfoot opening region removed is formed into a dimensional shoe.

Figure 6:
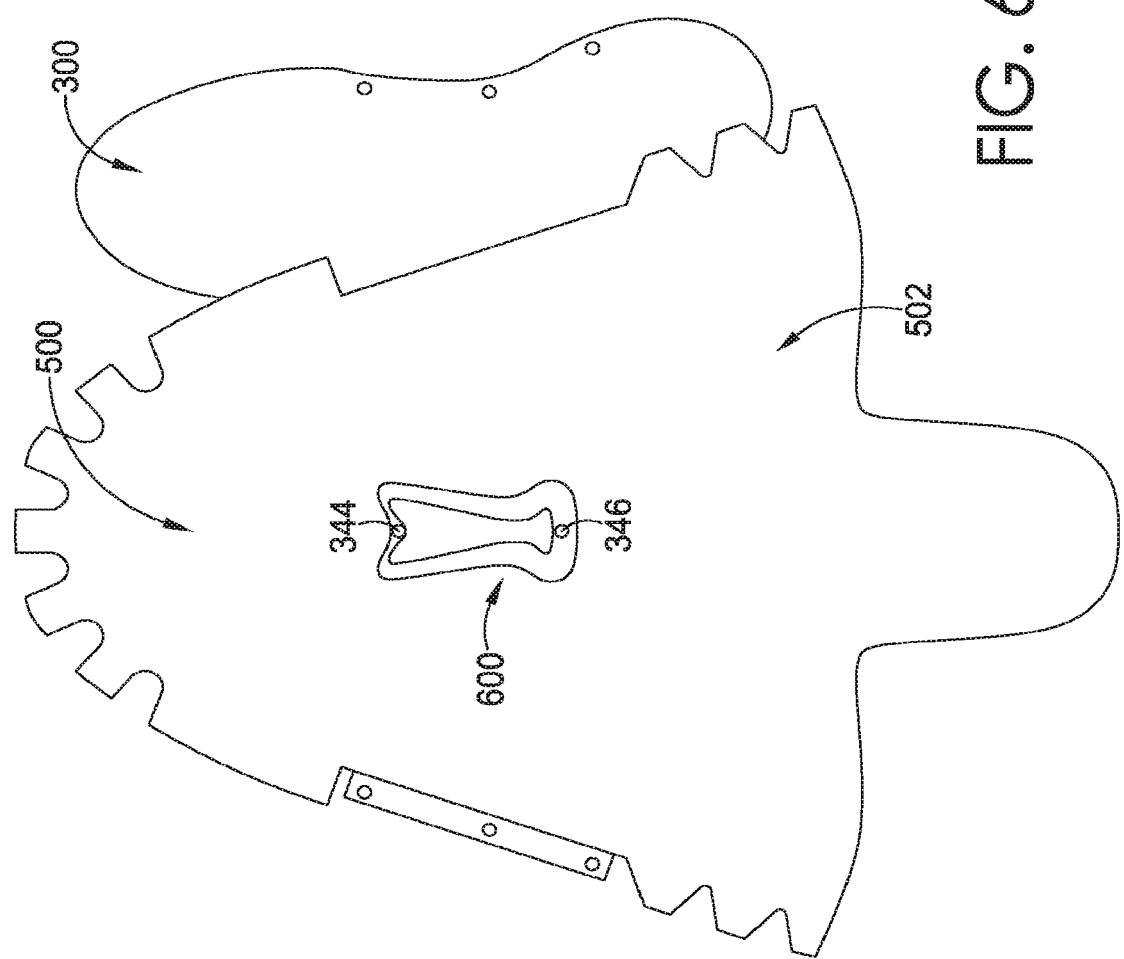
FIG. 6 depicts another exemplary overlay, an eye stay overlay, coupled with the flat pattern upper of FIG. 5, in accordance with aspects hereof.

Turning to FIG. 6, that depicts another exemplary overlay, an eye stay overlay 600, coupled with the flat pattern upper 300, in accordance with aspects hereof. In this example, the eye stay overlay 600 is coupled to the top surface 502 of the overlay 500. However, it is contemplated that an overlay may be coupled with any other materials forming the flat pattern upper 300, such as the substrate itself. The eye stay overlay includes alignment apertures aligned with the origin 344 and the second origin 346 to achieve an appropriate position, orientation, and rotation. The eye stay overlay 600, in an exemplary aspect, is formed from a durable material, such as leather or a polymer-based material (e.g., thermoplastic polyurethane). The eye stay overlay 600 may serve as a reinforcement material through which one or more eyelets are formed for a lacing structure. The eye stay overlay 600 demonstrates engineered placement of functional materials on an in-line manufactured shoe. Also, the location of the eye stay overlay 600 highlights a benefit of having the origin 344 in the position on the flat pattern upper 300 provided above, such that it can serve as a positional guide for components proximate the midfoot opening region while still being removed, if necessary.

Figure 7:
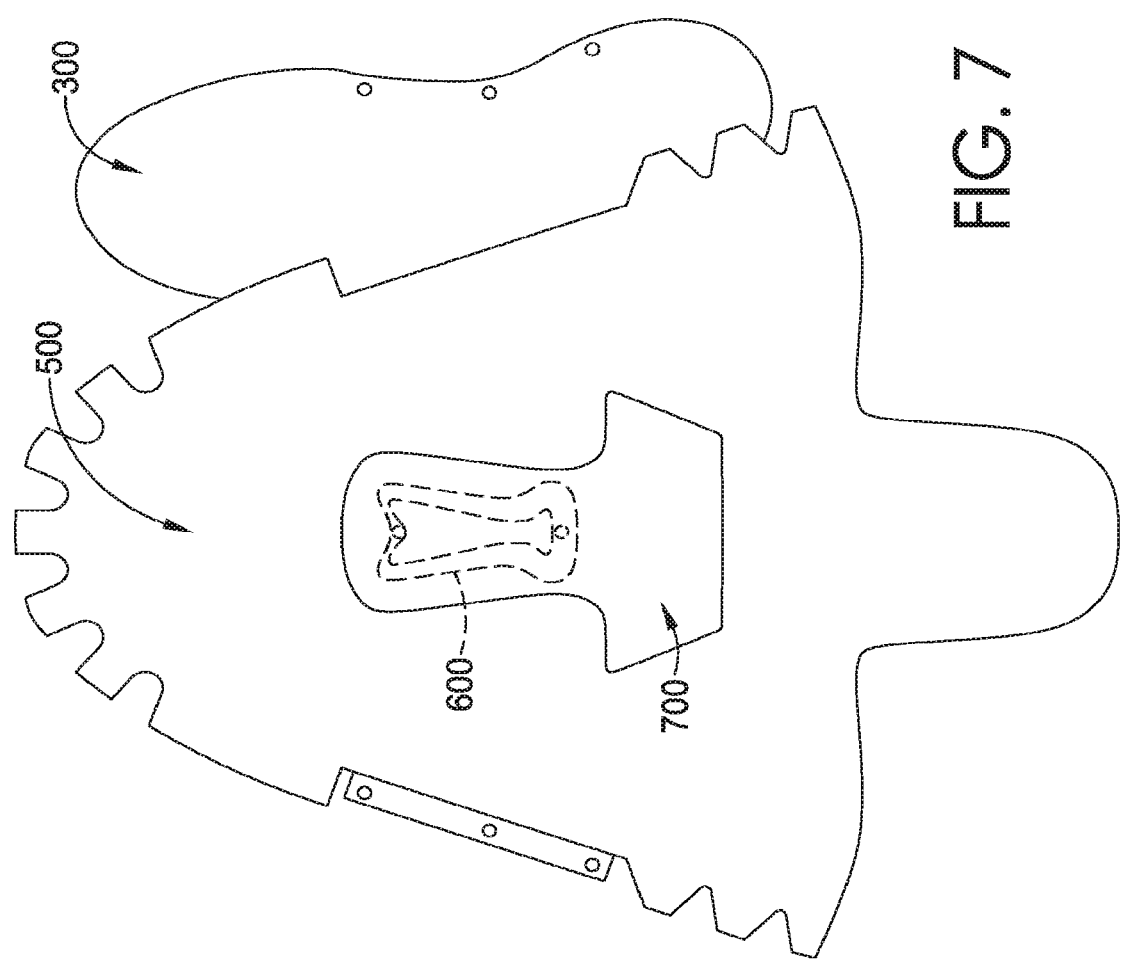
FIG. 7 depicts a midfoot overlay positioned over the eye stay overlay of FIG. 6, in accordance with aspects hereof.

Turning to FIG. 7 that depicts a midfoot overlay 700 positioned over the eye stay overlay 600 of FIG. 6, in accordance with aspects hereof. As can be appreciated, the flat pattern upper 300 may be formed from a plurality of layers positioned, secured, and aligned to form a desired resulting flat pattern upper 300. In this example, it is contemplated that the eye stay overlay 600 and the midfoot overlay 700 have yet to be permanently secured to the underlying material (e.g., substrate). Instead, one or more alignment pins may maintain the appropriate alignment until a coupling process is performed, which may concurrently couple multiple overlays. Alternatively, it is contemplated that an overlay may be coupled to an underlying material prior to another overlay being applied. So, in this example, the eye stay overlay 600 may be coupled with the overlay 500 prior to the midfoot overlay 700 being applied, in an exemplary aspect.

The midfoot overlay 700 may serve as an eyebrow finish material, in an exemplary aspect. As will be discussed hereinafter, the midfoot overlay 700 may form a perimeter edge of the midfoot opening once removed. Additionally, as will be illustrated in FIG. 8, the midfoot overlay may serve as a nested tongue 810 finish material at a top edge 812 of the nested tongue 810. Therefore, a common overlay may serve multiple roles in the flat pattern upper 300 construction.

Figure 8:
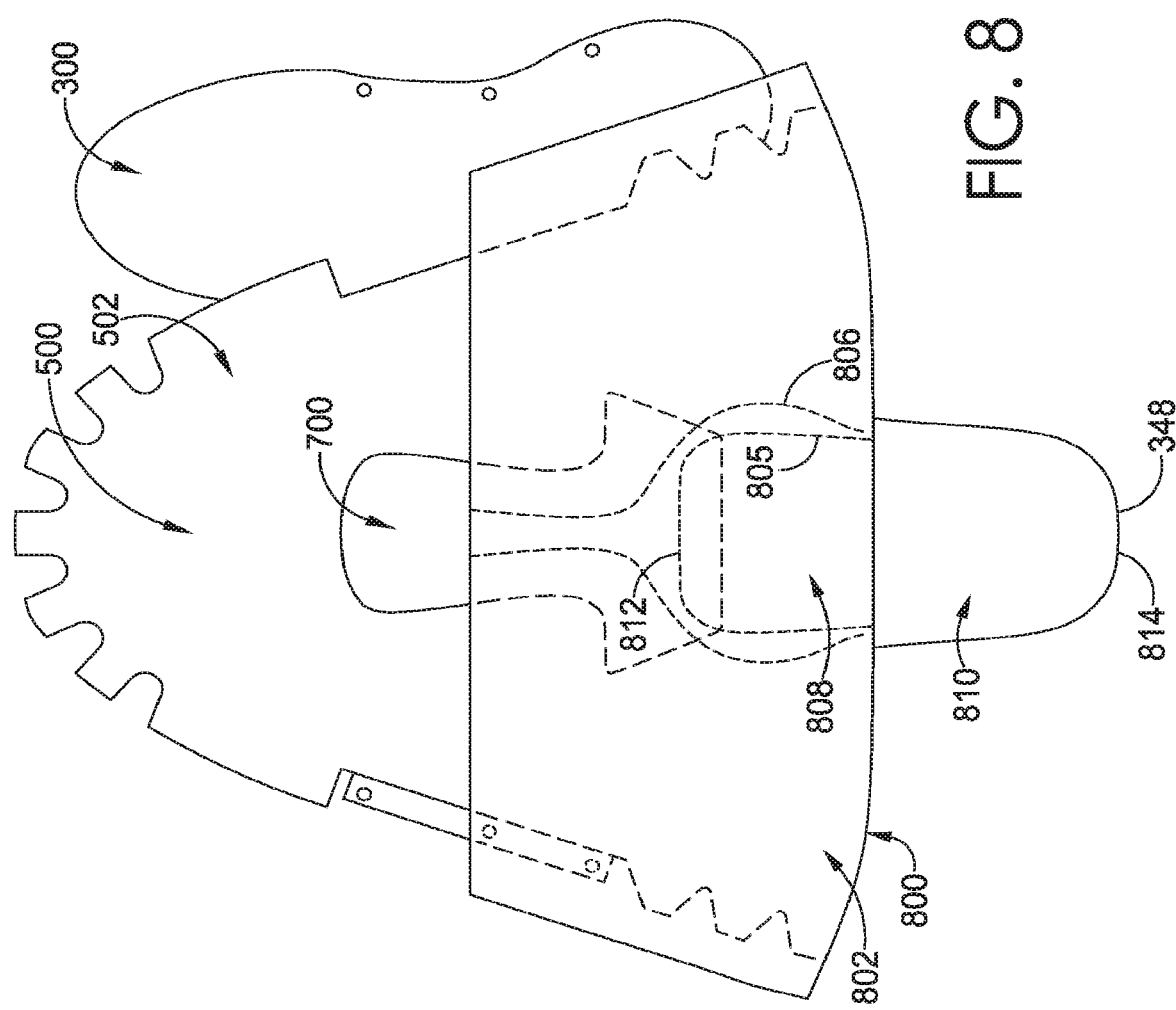
FIG. 8 depicts the flat pattern upper of FIG. 7 comprised of the overlay, the eye stay overlay, the midfoot overlay, and a collar liner, in accordance with aspects hereof.

Turing now to FIG. 8 that depicts the flat pattern upper 300 comprised of the overlay 500, the eye stay overlay (not shown), the midfoot overlay 700, and a collar liner 800, in accordance with aspects hereof. The collar liner 800 is an exemplary overlay. In an exemplary aspect, the collar liner is formed from a knit or woven material that provides a comfortable surface against which a user's ankle may contact. As will be described in FIGS. 14 and 15, the collar liner 800 may extend through a midfoot opening (and ankle opening) to an interior cavity of the dimensional shoe to form a liner of the cavity. Therefore, the collar liner 800 may be inverted, as will be discussed, to transition from the flat pattern state to the dimensional shoe state, in an exemplary aspect.

The collar liner 800, in an exemplary aspect, may also serve as a tongue liner for the nested tongue 810. However, as provided herein, the configuration, shape, and sizing of the flat pattern upper 300 is exemplary and it is contemplated that aspect may omit one or more features, such as the nested tongue 810.

In this example, the collar liner 800 is positioned with an interior surface 802 away from the underlying material and an exterior surface 804 (not shown in FIG. 8, but shown in FIG. 15) facing the underlying materials. The interior surface 802, when formed into a dimensional shoe, faces a bottom surface of the flat pattern upper, such as a bottom surface of the substrate. The exterior surface 804, when formed into a dimensional shoe, forms a foot contacting surface of the dimensional shoe, as is depicted in FIG. 15 hereinafter.

The collar liner 800 extends from proximate the upper medial heel end 308 and the upper lateral heel end 310 in a toewardly direction. The collar liner 800 may extend across a portion of the midfoot opening region, as depicted in FIG. 8. The collar liner 800 may extend across a portion, but not all of the way to a toeward end, of the midfoot overlay 700, as also depicted in FIG. 8. The collar liner 800 may extend, in a medial-to-lateral direction, across a medial side and a lateral side of the upper portion of the flat pattern upper in a coextensive fashion. This width of extension in the medial-to-lateral direction provides sufficient collar liner material to extend down internal sidewall of an internal cavity of the dimensional shoe at an ankle opening. This allows the collar liner 800 to serve as a collar liner of the dimensional shoe.

The collar liner is coupled, such as through stitching, welding and/or adhering, with underlying materials of the flat pattern upper 300. A coupling location 806 (e.g., seam) is depicted in dashed lines. The coupling location 806 couples the collar liner 800 with the flat pattern upper 300 proximate an ankle opening region and a midfoot opening region. The coupling location 806 may form a seam defining a perimeter of the ankle opening and a portion of the midfoot opening, in an exemplary aspect, as depicted in FIG. 9.

As depicted in FIG. 8, the optional nested tongue 810 having the bottom edge 814 and the top edge 812 may also be coupled with the collar liner 800 along a tongue coupling 805. The tongue coupling secures a portion of the collar liner 800 that is intended to be removed from the ankle opening region to the nested tongue 810 proximate the top edge 812. In this manner, the collar liner may serve as a backing for the nested tongue when integrated into the dimensional shoe. For example, it is contemplated that the nested tongue 810 having the collar liner 800 and a portion of the midfoot overlay 700 at the top edge coupled together may be removed from the flat pattern upper adjacent to the tongue coupling 805. The bottom edge 814 may be secured with a vamp region (e.g., toewardly area of the midfoot opening) and the top edge 812 may extend toward the ankle opening of the dimensional shoe, in an exemplary aspect.

Figure 9:
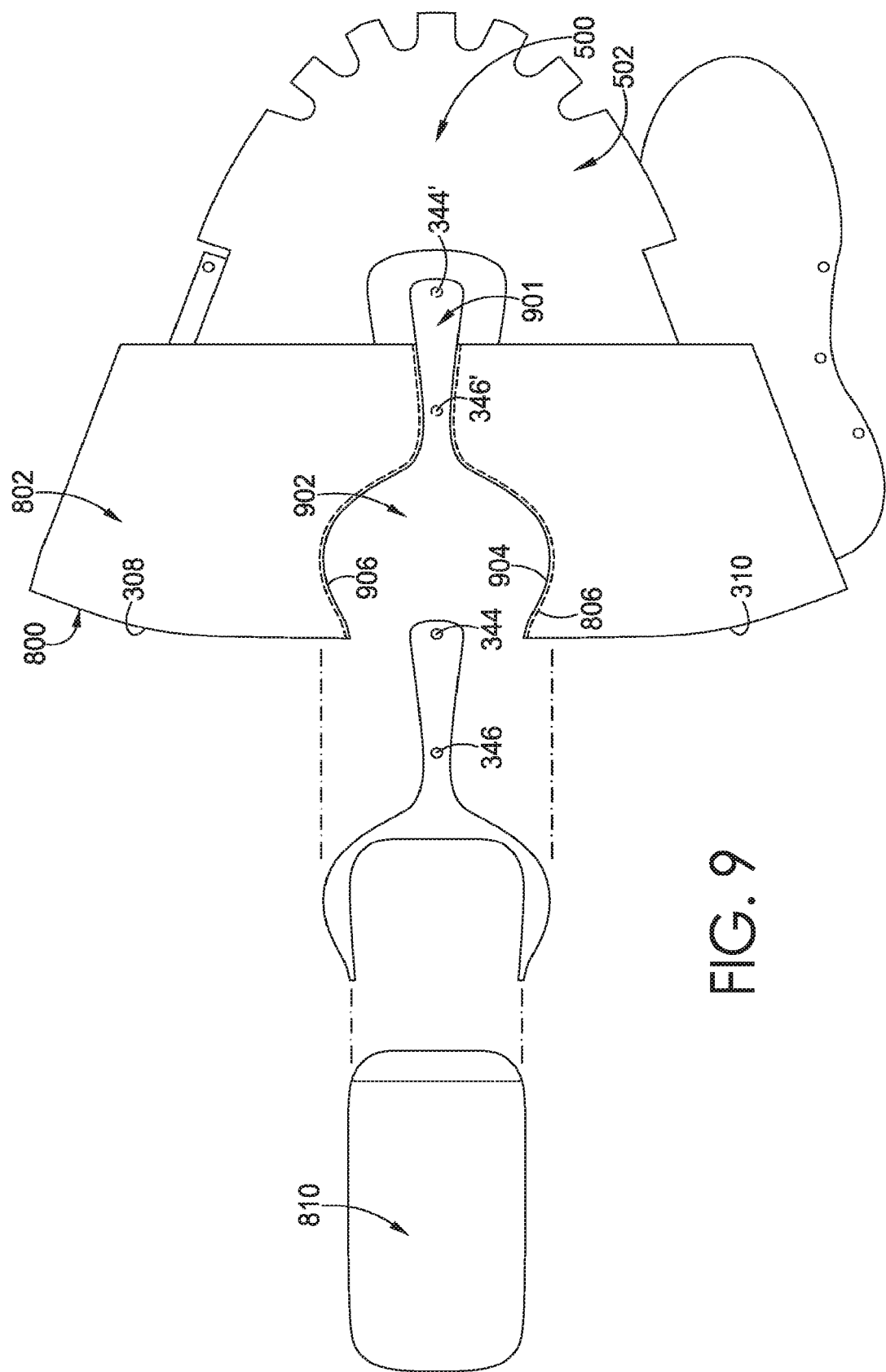
FIG. 9 depicts the flat pattern upper of FIG. 8 having the ankle opening region, midfoot opening region, and nested tongue removed from the flat pattern upper, in accordance with aspects hereof.

FIG. 9 depicts the flat pattern upper having the ankle opening region 902, the midfoot opening region 90, and the nested tongue 810 removed from the flat pattern upper, in accordance with aspects hereof. The coupling location 806 is depicted as a dashed line indicating where the collar liner 800 is secured with the underlying materials proximate the newly formed ankle opening 902 that extends into the midfoot opening 901. The origin 344' and second origin 346' are depicted for illustration purposes as they are removed as part of the material removed from a midfoot opening 901 and ankle opening 902. As previously provided, the position of the origin 344 and the second origin 346 may be selected such that following a coupling of materials, the origin aperture may be removed so to not interfere with the function and/or aesthetics of the dimensional shoe. The ankle opening 902 and midfoot opening region 901 are defined, in part by a lateral opening edge 904 and a medial opening edge 906. It is contemplated that the lateral opening edge 904 and the medial opening edge 906 are formed from a cutting operation that allows for the removal of the material at the ankle opening 902. Further, as will be depicted in FIG. 15, the lateral opening edge 904 and the medial opening edge 906 may be obscured as the collar liner 800 is inverted to form the collar liner of the dimensional shoe, in an exemplary aspect.

Turning briefly to FIG. 18 illustrating a flow diagram 1800 representing a method of manufacturing an article of footwear having an integrated collar liner to a flat pattern upper, in accordance with aspects hereof. At a block 1802, a flat pattern upper portion having a top surface and an opposite bottom surface is formed. In an exemplary aspect, this forming may include providing one or more processes, such as cutting and coupling. An example of forming an upper portion is depicted in FIGS. 3-7, for example.

At a block 1804, a collar liner is overlaid on the upper portion formed in block 1802. The collar liner having an interior surface and an exterior surface. The collar liner is positioned on the upper portion such that the collar line exterior surface faces the upper portion top surface when in the planar configuration.

At a block 1806, the collar liner is secured with the upper portion to form a collar liner seam. As provided herein, securing may be accomplished through welding, adhering, tacking, sewing, and the like. In an exemplary aspect, a computer controlled machine, such as a long-arm quilting machine may sew the collar liner and other components forming the upper portion together at the collar seam.

At a block 1808, a portion of the collar liner and the upper portion near the collar seam are removed from the flat pattern upper. For example, materials in an ankle opening region and a midfoot opening region may be removed, such as being cut out from the remainder of the upper portion. The removal of the material may form the ankle opening and the midfoot opening of the to-be-formed dimensional shoe. As previously discussed with FIG. 8, it is also contemplated that the removed material may include a nested tongue that may then be processed for inclusion in the dimensional shoe.

Figure 11:
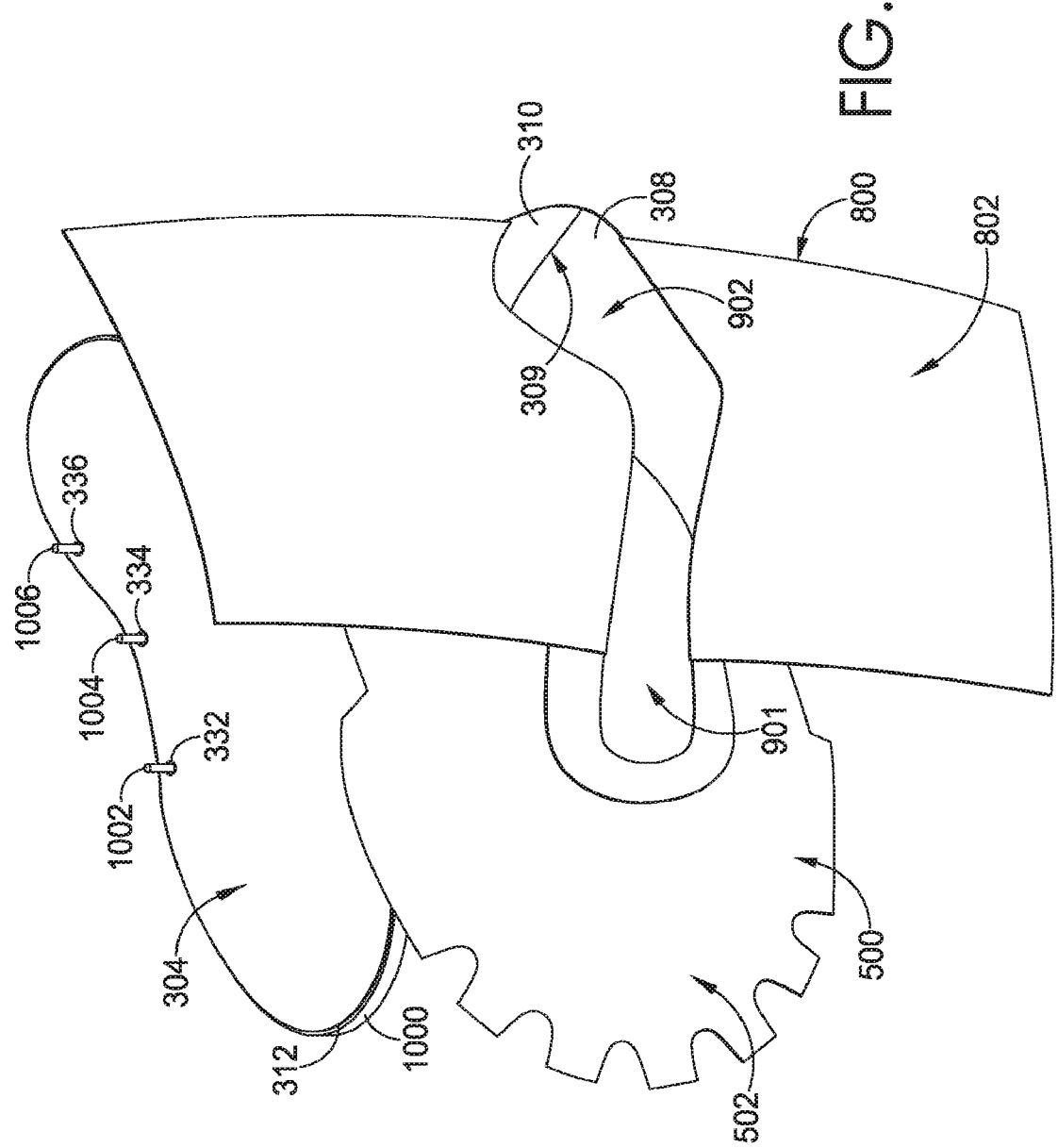
FIG. 11 depicts the alignment pins of the alignment tool from FIG. 10 extending through the footbed forming apertures of the flat pattern upper after having been joined at the heel region from FIG. 9, in accordance with aspects hereof.

At a block 1810, the collar liner is inverted relative to the upper portion. This process may include joining the upper medial heel end 308 with the upper lateral heel end 310 (as depicted in FIG. 11 hereinafter). Additionally, edges of the collar liner corresponding to the upper medial heel end 308 and the upper lateral heel end 310 may also be joined. The joining may be accomplished by a number of seaming techniques, such as a butt zigzag stitch. However, other techniques, such as welding, adhering, and the like are contemplated. The collar liner portion may now be inverted, as depicted in FIG. 15, such that the exterior surface of the collar liner transitions to facing away from the top surface of the underlying material at locations distal from the coupling location (e.g., collar seam). This inversion causes the collar liner to form a liner in the being-formed dimensional shoe. Stated differently, the inversion of the collar liner causes the collar liner to extend from what will be the exterior of the dimensional shoe to the internal cavity of the dimensional shoe.

At a block 1812, the upper portion having the inverted collar liner is formed into a dimensional shoe, such as the shoe depicted in FIG. 14.

Forming the Dimensional Shoe

Figure 10:
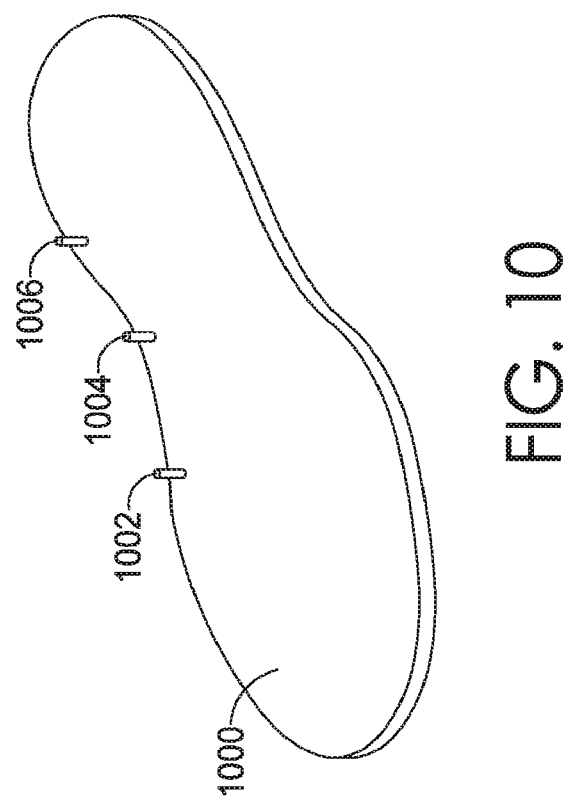
FIG. 10 depicts an exemplary alignment tool, in accordance with aspects hereof.

Turning to FIG. 10, that depicts an exemplary alignment tool 1000, in accordance with aspects hereof. While the alignment tool 1000 is depicted having a particular size and shape, it is contemplated that the alignment tool may be any size and shape sufficient to align two or more forming apertures. The alignment tool 1000 is depicted with a first alignment pin 1002, a second alignment pin 1004, and a third alignment pin 1006. The number, position, and size of alignment pins may vary and the depiction in FIG. 10 is not limiting.

Turning to FIG. 11, that depicts the alignment pins 1004, 1002, and 1006 extending through the footbed first aperture 334, the footbed second aperture 332, and the footbed third aperture 336, respectively, in accordance with aspects hereof. The forming apertures of the footbed portion 304 previously discussed in FIGS. 3-9 are aligned on the alignment tool 1000 through the mechanical engagement of the alignment pins and the forming apertures.

As also depicted in FIG. 11, the upper medial heel end 308 and the upper lateral heel end 310 have been joined as a seam 309. As previously discussed the seam 309 may be sewn, sealed, adhered, welded, and the like. While the seam 309 combines a first part (e.g., medial side) of the upper portion 302 with a second part (e.g., lateral side) of the upper portion 302 in a vertical seam 309, it is contemplated that a first part and a second part of the upper portion 302 may be joined at any location. For example, the joining may occur at the toe end, the lateral side, the medial side, extending across multiple regions, and the like. Further, it is contemplated that the joining seam may extend in a non-vertical manner. For example, the joining seam may extend in an angled fashion from the midfoot opening 901 and/or the ankle opening 902 toward an outer edge (e.g., medial or lateral perimeter) in a toeward or heelward direction, in exemplary aspects.

While the collar liner 800 is depicted as being secured proximate the ankle opening 902, it is contemplated that in aspects the collar liner is also secured with one or more layers (e.g., substrate, overlay, itself), which may or may not be proximate the seam 309. Further, as depicted, the collar liner 800 in FIG. 11 has yet to be inverted to extend into a to-be-formed foot-receiving cavity. However, it is contemplated that the collar liner 800 may be inverted prior to forming the seam 309, prior to the alignment with the alignment tool 1000, and/or prior to the depiction of FIG. 12 hereinafter, in exemplary aspects.

Figure 12:
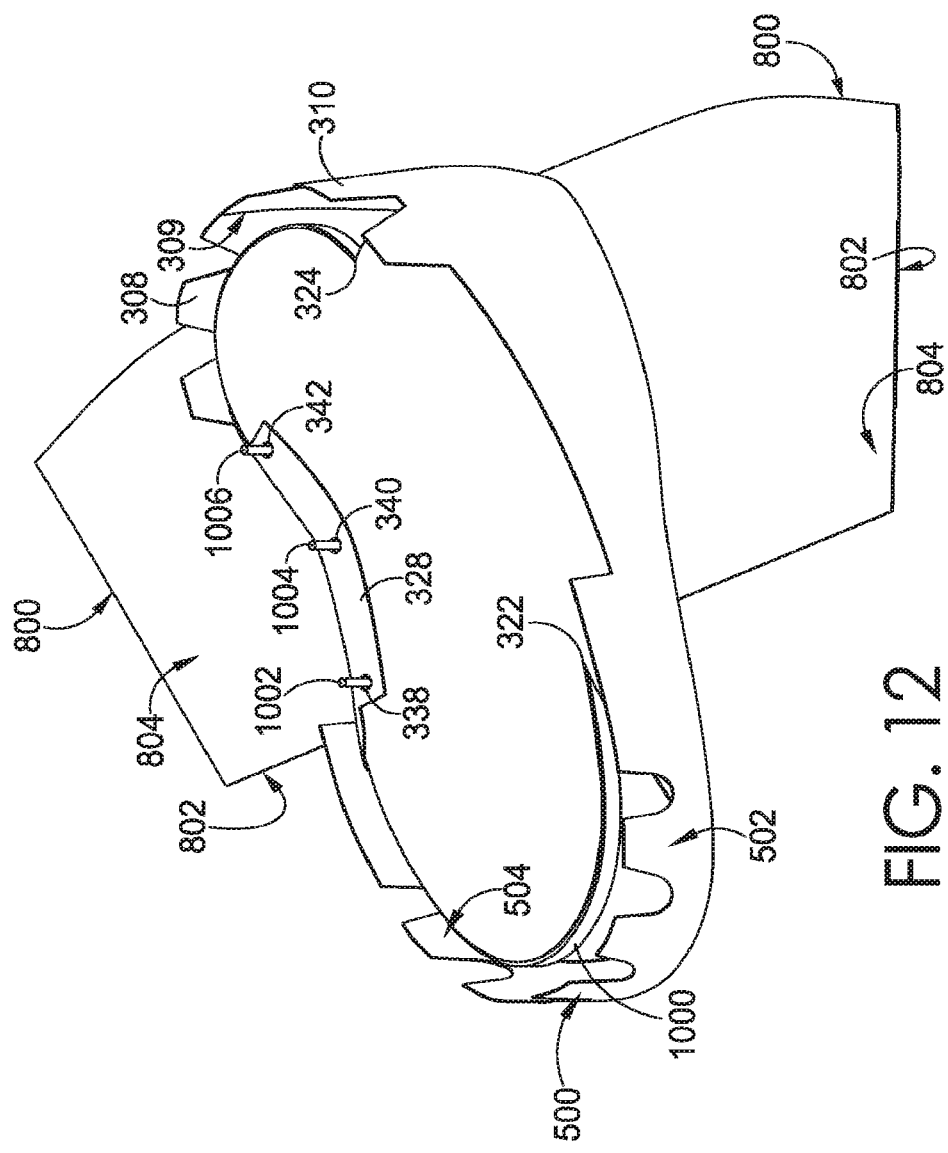
FIG. 12 depicts the upper portion of FIG. 11 wrapping around the alignment tool such that the forming apertures of the medial flap are mechanically engaged by the alignment pins, in accordance with aspects hereof.

FIG. 12 depicts the upper portion wrapping around the alignment tool 1000 such that the forming apertures of the medial flap are mechanically engaged by the alignment pins, in accordance with aspects hereof. For example, the second alignment pin 1004 extends through both footbed first aperture 334 and the upper first aperture 340. The first alignment pin 1002 extends through both of the footbed second aperture 332 and the upper second aperture 338. The third alignment pin 1006 extends through both the footbed third aperture 336 and the upper third aperture 342. Based on the alignment provided by the alignment tool, the medial flap (or other portions of the upper portion) is coupled with the footbed portion. For example, a weld or adhesive may be used to couple the portion together such that once the alignment tool 1000 is removed the forming apertures remain in an acceptable relative location.

Similar to the discussion of FIG. 11 with respect to the collar liner 800, the collar liner 800 is depicted not being inverted into the being-formed internal cavity of the dimensional shoe; however, the collar liner 800 at the depicted stage could be inverted into the internal cavity that will serve as a foot-receiving cavity of the dimensional shoe. Further, the heel-end edges that may be joined are depicted in a non-joined manner in FIG. 12; however, it is also contemplated that the heel end edges may be joined prior to or subsequent to the upper portion wrapping around the alignment tool 1000 such that the forming apertures of the medial flap are mechanically engaged by the alignment pins, as depicted in FIG. 12.

Figure 13:
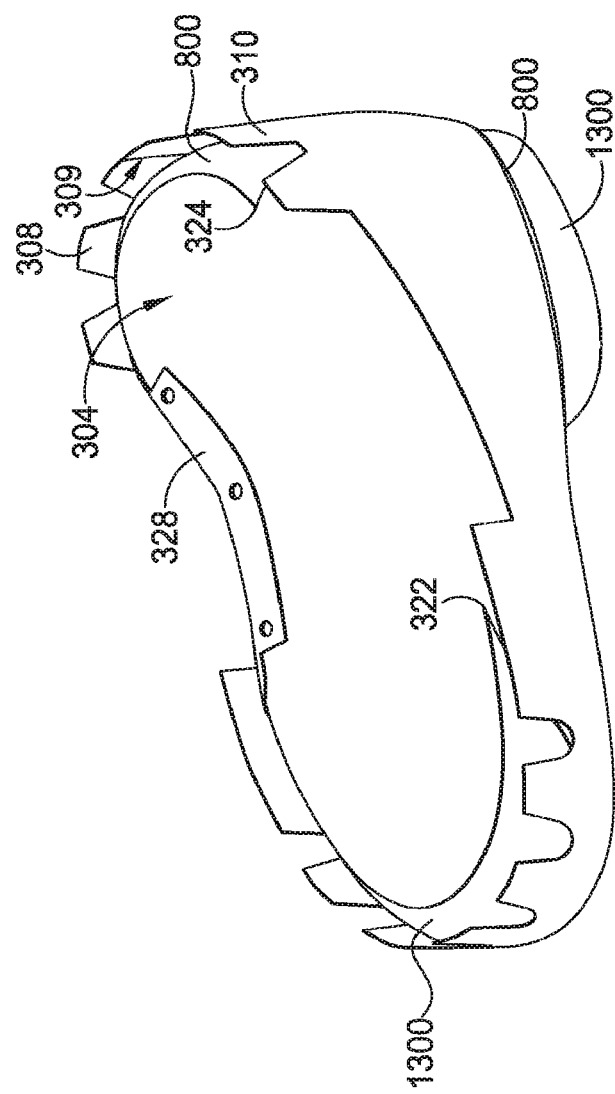
FIG. 13 depicts a last inserted into a volume created by coupling a medial flap with a footbed portion, in accordance with aspects hereof.

FIG. 13 depicts a last 1300 inserted into a volume created by coupling the medial flap 328 with the footbed portion 304, in accordance with aspects hereof. Unlike FIG. 12 that relied on the alignment tool 1000 to align the medial flap 328 for coupling with the footbed portion 304, the last 1300 is a tool intended for forming the shape of the dimensional footwear. It is contemplated that the last 1300 is effective to position, set, and align the inverted collar liner 800 within the cavity occupied by the last 1300, as depicted. Therefore, the collar liner 800 is inverted such that is extends from the ankle opening and a portion of the midfoot opening into the internal cavity occupied by the last 1300. As a result of this inversion, the collar liner 800 forms an edge of the ankle opening as depicted in FIG. 14 hereinafter. In an exemplary aspect, the heel end edges (or any edges to be coupled) of the collar liner are secured together prior to the insertion of the last 1300. However, it is also contemplated that an adhesive or other bonding agent is applied to the collar liner 800 or an interior portion of the dimensional shoe to maintain the collar liner 800 in a positioned place of the internal cavity, in an exemplary aspect.

It is contemplated that one or more portions of the flat pattern upper are then formed around the last 1300. For example, one or more portions may have a heat-activated agent that when exposed to heat, increases the rigidity of the material(s) where the agent is applied. For example, in the toe box region of the dimensional shoe, it is contemplated that the agent is applied and heat is introduced to form the toebox region about the inserted last 1300. Upon removal of the last 1300, the toebox region maintains a shape guided by the last 1300 as the agent has cured and assists in maintaining the shape. The agent may be applied to other portions, such as the heel region, to provide similar characteristics in those regions to which it is applied.

Similarly, it is contemplated that one or more parts of the materials forming the dimensional shoe may be coupled together while the last 1300 is maintained within the internal cavity. For example, an adhesive may be applied along perimeter portions of one or more overlays to secure the overlay to one or more other materials, such as the substrate, while the last 1300 is present. This allows for the dimensional shoe to be formed from a substantially planar flat upper to a dimensional shoe having the desired shape, size, and curvatures. In another example, the portions of the overlay (or substrate) forming the upper portion 302 in the toe end and/or heel end that extend around the last 1300 may be secured to the footbed portion 304 to substantially enclose the internal cavity containing the last 1300, in an exemplary aspect.

Further, yet, it is contemplated that a sole may be applied to the lasted upper. Therefore, it is contemplated that the flat pattern upper, when formed about the last 1300, may have a sole applied as is known in the art.

FIG. 14 depicts a formed dimensional shoe from the flat pattern upper of FIG. 3-9, in accordance with aspects hereof. As can be seen, the collar liner 800 extends from an exterior location proximate the ankle opening 902 into an interior cavity occupied by the last 1300. The collar liner extends from an exterior inferior location 1402 to an apex 1400 before turning back into the internal foot-receiving cavity of the shoe. A simplified cross section is provided in FIG. 155 along cut line 15 of FIG. 14. The cross section of FIG. 15 illustrates the exterior surface 804 of the collar liner 800 initially facing the top surface 502 of the overlay 500 at the coupling location 806 (proximate the exterior inferior location 1402). The cross section of FIG. 15 further depicts the exterior surface 804 transitioning, such as at apex 1400, to face away from the top surface 502 of the overlay 500. This construction allows for the collar liner 800 to serve as both a foot-receiving cavity liner as well as a superior edge at the ankle opening with a finished seam coupling the collar liner to one or more materials forming the exterior of the dimensional shoe.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A method of manufacturing an article of footwear from a flat pattern, the method comprising:
    forming an origin aperture that extends through an upper portion, the origin aperture located within a midfoot region of the upper portion;
    coupling an overlay having an alignment aperture to the upper portion, such that the alignment aperture is aligned with the origin aperture;
    removing the midfoot region having the origin aperture from the upper portion; and
    subsequent to removing the midfoot region from the upper portion, forming the upper portion into a three-dimensional shape configured to receive a foot.

2. The method of claim 1, wherein forming the origin aperture comprises cutting a hole in the upper portion that is between 1 millimeter and 10 millimeters in diameter.

3. The method of claim 1, wherein coupling the overlay comprises stitching, adhering, or welding the overlay to the upper portion.

4. The method of claim 1, wherein removing the midfoot region comprises removing a portion of the overlay bonded with the midfoot region.

5. The method of claim 1, wherein the midfoot region includes an intersection of:
    a midline reference line extending down a heel of the upper portion when placed on a last; and
    a ball-width line extending in a medial-to-lateral direction along a ball region of the upper portion when placed on the last.

6. A method of manufacturing an article of footwear from a flat pattern, the method comprising:
    forming an origin aperture extending through an upper portion, the origin aperture positioned within a midfoot region of the upper portion,
        wherein the upper portion has an upper toe end with a convex edge and an opposite upper heel end, and an upper medial side and an opposite upper lateral side, wherein the upper heel end comprises a lateral heel end and a medial heel end and forms a nested tongue, and wherein the nested tongue is positioned between the lateral heel end and the medial heel end,
        wherein the origin aperture extends through the upper portion at a location within 10 millimeters of a midline of the upper portion between the upper toe end and the upper heel end; and
    coupling an overlay having an alignment aperture to the upper portion, such that the alignment aperture is aligned with the origin aperture.

7. The method of claim 6, further comprising:
    removing the midfoot region with the origin aperture from the upper portion;
    removing the nested tongue from the upper portion; and
    subsequent to removing the midfoot region and the nested tongue, forming the upper portion into a three-dimensional shape configured to receive a foot.

8. The method of claim 7, wherein removing the midfoot region and removing the nested tongue comprises removing a portion of the overlay bonded with the midfoot region.

9. The method of claim 6, wherein forming the origin aperture comprises cutting a hole through the upper portion that has a diameter between 1 millimeter and 10 millimeters.

10. The method of claim 6, wherein coupling the overlay comprises stitching, adhering, or welding the overlay to the upper portion.

11. The method of claim 6, wherein the midline of the upper portion extends through the upper toe end at an apex of the convex edge of the upper toe end and the shoe upper midline extends through the upper heel end equidistant between a medial heel intersection between the upper heel end and the upper medial side and a lateral heel intersection between the upper heel end and the upper lateral side.

12. A method of manufacturing a flat pattern for an article of footwear, the method comprising:
    forming an upper portion having a toe end with a convex edge and an opposite heel end, a medial side and an opposite lateral side, such that the upper portion comprises:
        a midline reference line extending between the toe end and the heel end;
        an origin aperture extending through the upper portion at a location within 10 millimeters of the midline reference line between the toe end and the heel end and within a midfoot region of the upper portion, wherein the midfoot region defines a part of the upper portion that is subsequently removed during manufacturing, and wherein the origin aperture is located between a first side of the midfoot region and a second side of the midfoot region, wherein the first side is closer to the medial side of the upper portion, and wherein the second side is closer to the lateral side of the upper portion;
    coupling an overlay to the upper portion between the toe end and the heel end and between the medial side and the lateral side, wherein the overlay comprises an alignment aperture extending through the overlay, and wherein the alignment aperture is aligned with the origin aperture.

13. The method of claim 12, wherein the origin aperture is located on a crossline reference line, and wherein the crossline reference line extends across a ball-width of the upper portion between the medial side and the lateral side.

14. The method of claim 12, wherein the midline reference line extends through the toe end at an apex of the toe end convex edge and the midline reference line extends through the heel end equidistant between a first intersection between the heel end and the medial side and a second intersection between the heel end and the lateral side.

15. The method of claim 12, wherein the origin aperture is positioned on a crossline reference line, and wherein the crossline reference line:
    extends between the medial side and the lateral side, and
    is positioned between the toe end of the upper portion and half-way between the toe end and the heel end of the upper portion.

16. The method of claim 12, wherein the origin aperture is a first origin aperture, and wherein the upper portion further comprises a second origin aperture, the second origin aperture positioned within 10 millimeters of the midline reference line and between the first origin aperture and the heel end.

17. The method of claim 16, wherein the alignment aperture is a first alignment aperture, and wherein the overlay further comprises a second alignment aperture, and wherein the second alignment aperture is aligned with the second origin aperture.

18. The method of claim 12, wherein the upper portion comprises a non-woven material.

19. The method of claim 12, wherein the overlay comprises a knit material or a woven material.

20. The method of claim 12, wherein the upper portion is coextensive with an integral footbed portion.

\* \* \* \* \*